United States Patent [19]

David

[11] Patent Number: 4,697,986
[45] Date of Patent: Oct. 6, 1987

[54] HELICOPTER BLADE CYCLIC PITCH CONTROL SYSTEM

[76] Inventor: Constant V. David, 4952 Field St., San Diego, Calif. 92110

[21] Appl. No.: 893,700

[22] Filed: Aug. 6, 1986

Related U.S. Application Data

[63] Continuation-in-part of Ser. No. 593,047, Mar. 26, 1984, Pat. No. 4,650,400.

[51] Int. Cl.$^4$ ............................................. B64C 27/605
[52] U.S. Cl. ...................................... 416/114; 416/158
[58] Field of Search .................... 416/114, 115, 132 R, 416/158, 167, 112, 113, 131 A, 31, 98

[56] References Cited

U.S. PATENT DOCUMENTS

| | | | |
|---|---|---|---|
| 1,427,015 | 8/1922 | Pescara | 416/24 |
| 3,031,017 | 4/1962 | Arcidiacono | 416/114 |
| 3,525,576 | 8/1970 | Dorand | 416/114 |
| 3,756,743 | 9/1973 | Robertson | 416/114 |
| 3,799,695 | 3/1974 | Yamakawa | 416/114 X |
| 4,650,400 | 3/1987 | David | 416/114 |

Primary Examiner—Everette A. Powell, Jr.

[57] ABSTRACT

A control and actuating system for adjusting the cyclic pitch of the blades of a helicopter automatically and independently in response to the blade gyrating angular position and to the helicopter forward velocity. This action is also independent of the control and adjustment of the collective pitch. The actuation of the blade pitch is performed by means of cams and followers. A hydraulic force-amplifying system is used between the follower/cam assemblies and the blade pitch actuator so as to isolate the follower/cam assemblies from the load carrying components of the system. The displacement signals generated by two cams are combined into a single linear displacement signal which causes a corresponding rotational movement of the blade. The axial position of one cam is determined by the pilot's action and the axial position of the other cam is defined by the helicopter forward speed. The two cams have surfaces that are not of revolution and which remain fixed for a given set combination of pilot's action and forward speed. The blade cyclic pitch variation is caused by the gyration of a housing to which the blades are attached and which contains and encloses the blade pitch control and actuating system.

23 Claims, 18 Drawing Figures

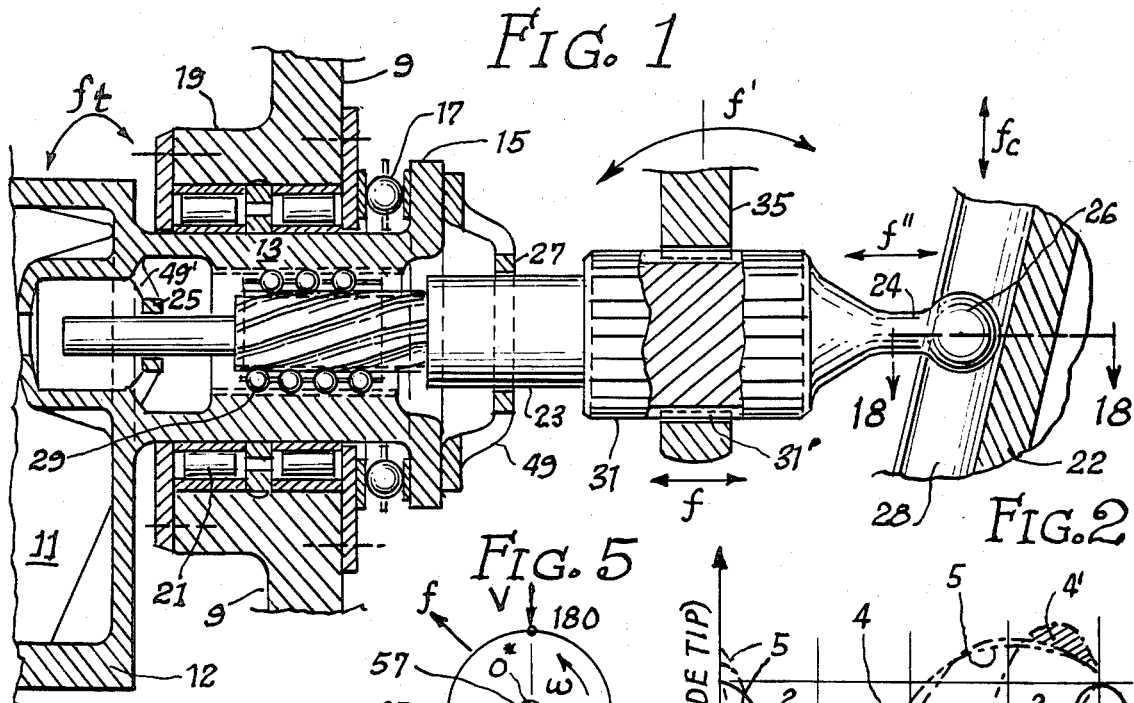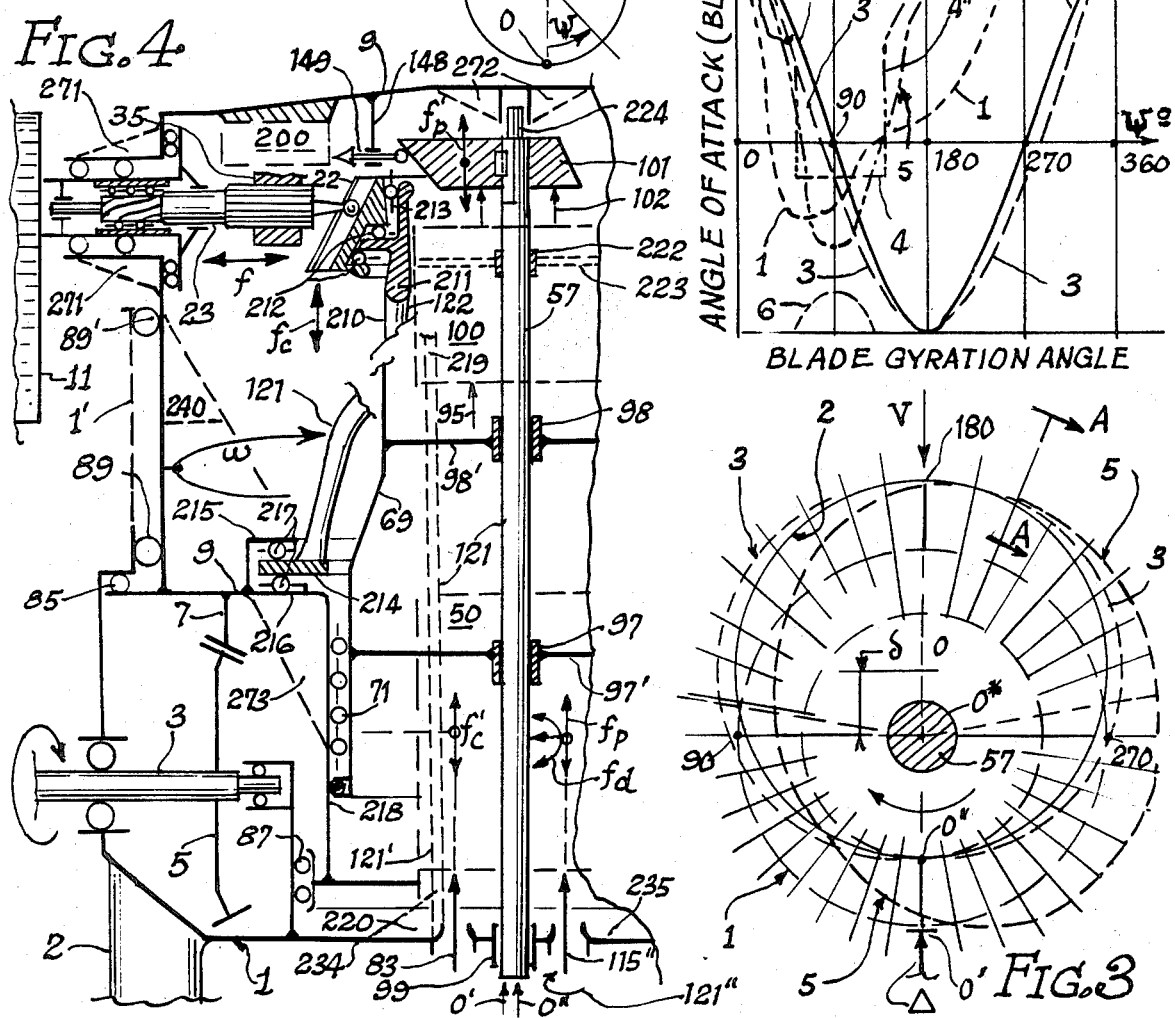

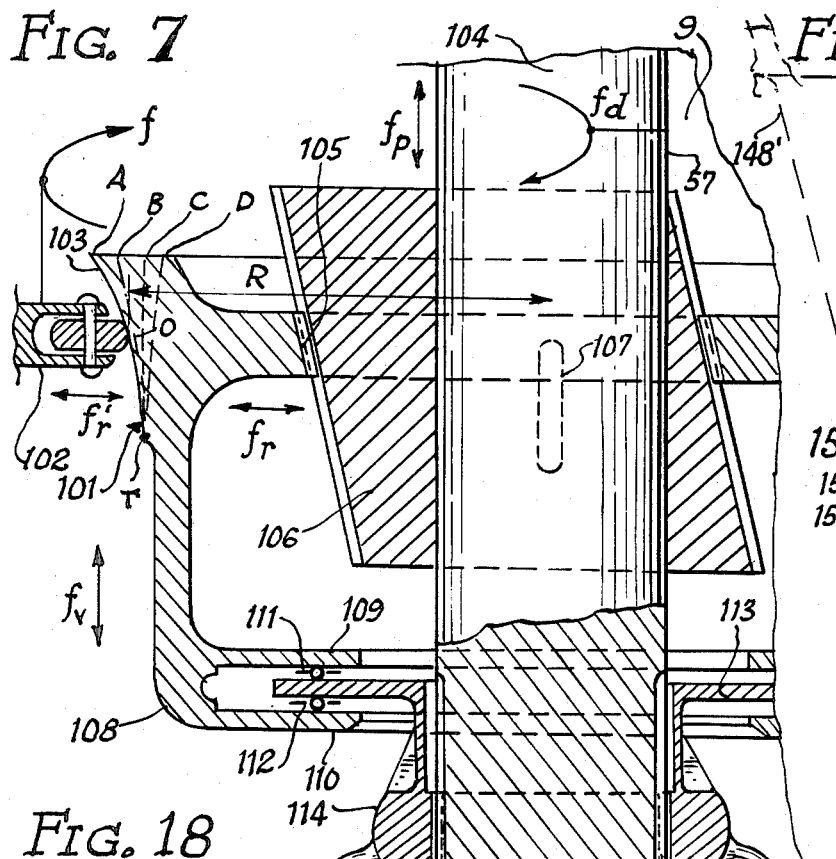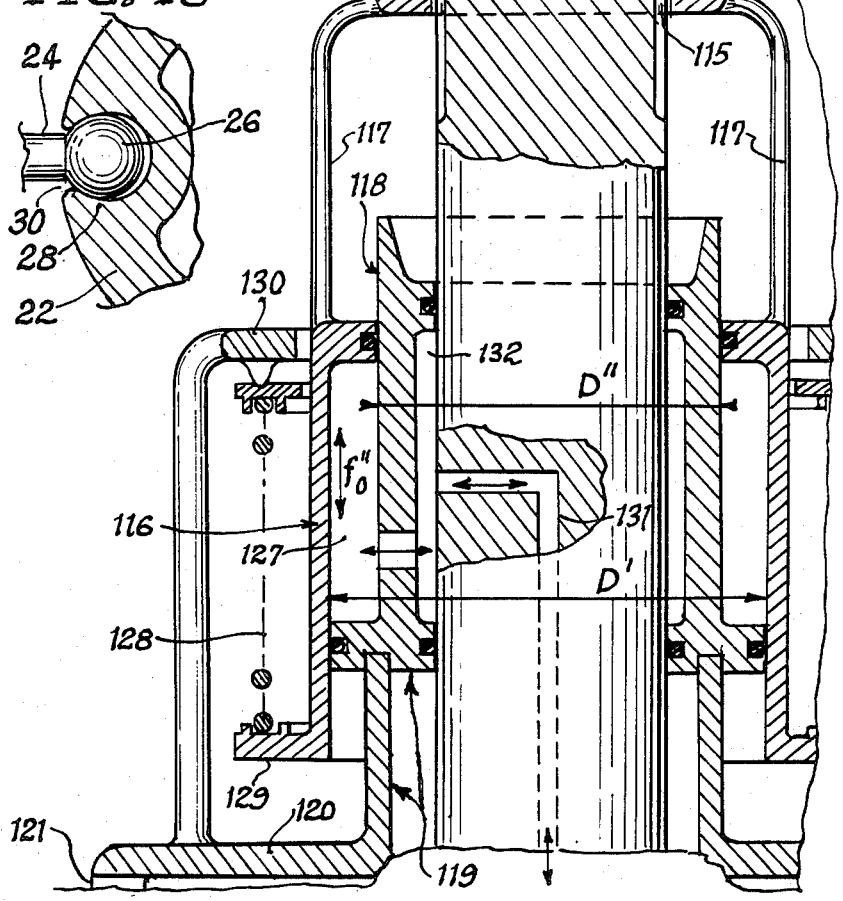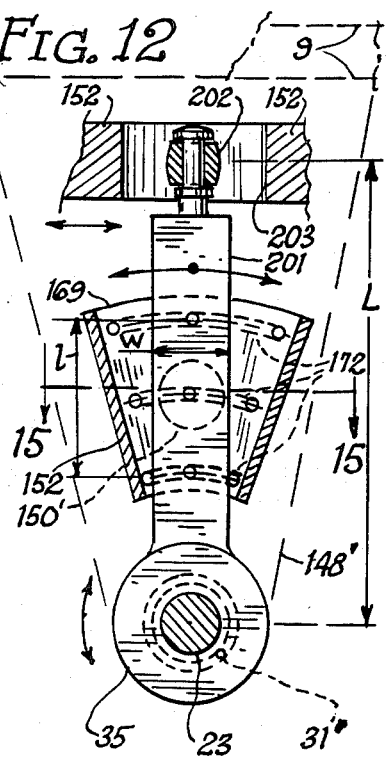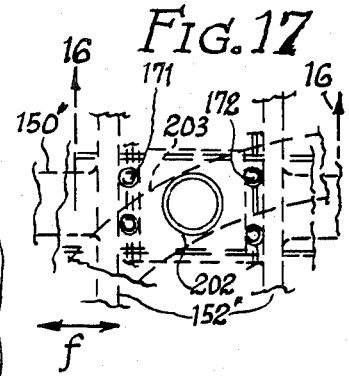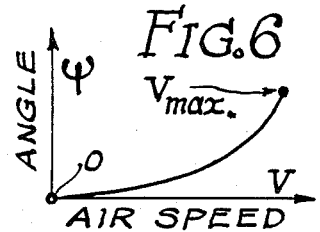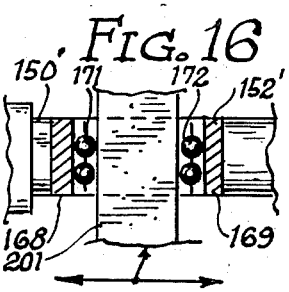

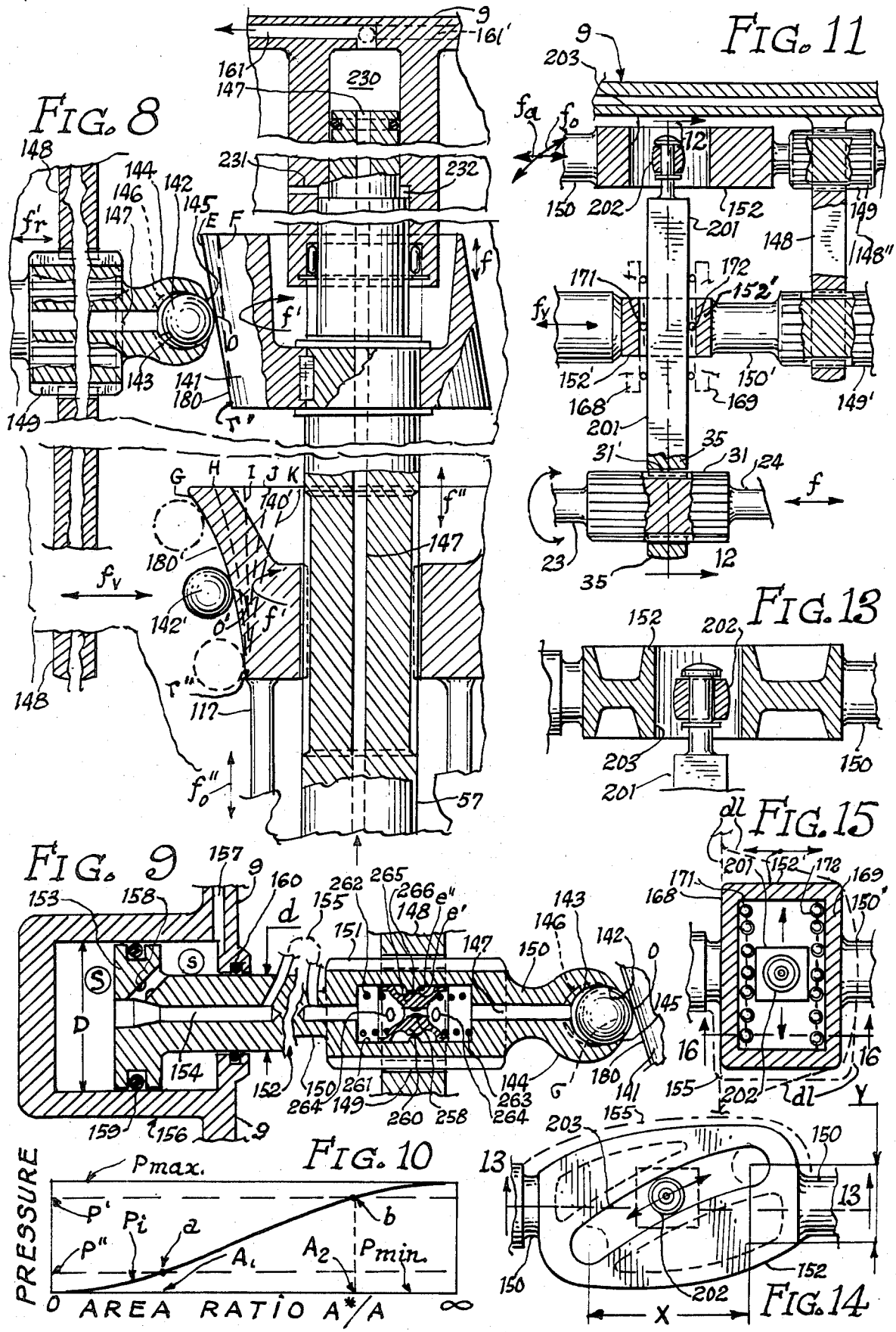

HELICOPTER BLADE CYCLIC PITCH CONTROL SYSTEM

CROSS-REFERENCE TO RELATED APPLICATION

This application is a continuation-in-part of my prior application Ser. No. 593,047 filed Mar. 26, 1984, and resulting in U.S. Pat. No. 4,650,400, dated Mar. 17, 1987, entitled HELICOPTER BLADE PITCH ADJUSTING SYSTEM.

BACKGROUND OF THE INVENTION

The present invention relates to the control and actuation of the blades of an helicopter, and more particularly, to the independent control and adjustment of the blade cyclic pitch in response to the pilot's action and the helicopter forward speed.

Considerable efforts have been made to give this cyclic pitch variation a non-sinusoidal characteristic during helicopter forward flight when the craft velocity very seriously affects the nature of such cyclic pitch variations. More particularly two U.S. Patents address the subject: (1) No. 3,031,017 entitled CYCLIC PITCH CONTROL of Arcidiacono, and (2) No. 3,756,743 entitled ROTORS FOR ROTARY WINGED AIRCRAFT of Robertson. Both references identify the problem and offer solutions but, in both instances, fail to handle the problem of cyclic pitch variation requirement as a function of the craft forward velocity. My own referenced application did not treat that problem either.

However, the mechanical solutions which are presented therein for independently controlling blade collective and cyclic angles of attack lend themselves to the insertion of mechanisms which can easily introduce corrections to the cyclic pitch variations as a function of craft speed. Although an additional degree of complexity is also introduced thereby, the use of force amplifying systems eliminates the drawbacks therefrom. All components of the control and actuating system are enclosed inside a sealed housing, which fully protects these components.

SUMMARY OF THE INVENTION

It is therefore a primary object of the present invention to provide a system for the control and adjusting of the cyclic pitch of helicopter blades in response to the combined independent actions of the pilot and craft forward speed.

It is another object of the present invention to provide an improvement in the use of cams and followers for responding to such actions which isolates such cam/follower assemblies against forces exerted on the blades during their gyration.

It is another object of the present invention to provide an integrated control system that combines the adjusting mechanisms of collective pitch and of cyclic pitch in one single actuating system whilst collective pitch and cyclic pitch responses remain independent of each other.

It is another object of the present invention to provide a control system in which the signal representative of craft forward velocity is directly introduced and amplified in the control system.

It is still another object of the present invention to provide a cyclic pitch control system which greatly facilitates the piloting of helicopters.

Accordingly, the present invention provides an externally located housing which positions, and maintains such positions, the blades of an helicopter as they gyrate. These blade positions are caused to adjust automatically and ideally, both relatively to one another and pitchwise, so as to minimize the effects of the craft forward velocity on the location of the vertical resultant of the aerodynamic forces exerted on the blades. Such automatic adjustment relieves the pilot of the permanent and concentrated attention which is usually required of helicopter pilots.

DESCRIPTION OF THE DRAWINGS

FIG. 1 is a partial midsectional elevation view of of the acutating mechanism of blade collective and cyclic pitches.

FIG. 2 is a graphic representation of the mean angle of attacks of a blade as a function of the blade rotational position.

FIG. 3 is a diagrammatic representation of various typical peripheral theoretical contours of a single cyclic pitch cam.

FIG. 4 is a schematic midsectional elevation drawing of an arrangement of the cyclic pitch control system, not showing the details of the cyclic pitch control system.

FIG. 5 is a diagram representative of the blade disc indicating how the cyclic pitch control stick position must normally be adjusted with the craft forward velocity.

FIG. 6 is a graphic representation of the adjustment above as a function of craft forward speed.

FIG. 7 is a partial midsectional elevation view of one construction of a cyclic pitch control system using a compound cam.

FIG. 8 is a partial midsectional elevation view of another construction in which two separate cams are used (dual cam).

FIG. 9 is a partial midsectional elevation view of the force-amplifying cam follower system.

FIG. 10 is a graphic representation of typical hydraulic pressure variations in the force-amplifying system.

FIG. 11 is a partial midsectional elevation view of the leverage system used to combine the cyclic pitch control command signals generated by a dual cam arrangement.

FIG. 12 is a partial plan sectional view of the above leverage system taken along section line 12—12 of FIG. 11.

FIG. 13 is a partial midsectional elevation view of the actuating sliding cam taken along section line 13—13 of FIG. 14.

FIG. 14 is a partial plan view of the sliding cam which actuates the end of the cyclic pitch adjusting lever.

FIG. 16 is a partial sectional plan view of the adjusting lever oscillation guiding system taken along section line 15—15 of FIG. 12.

FIG. 16 is a partial sectional plan view of the lever and of its guiding system taken along section line 16—16 of FIG. 17.

FIG. 17 is a schematic line diagram of a plan view of the arrangement of the sliding cam, lever and lever-guiding system shown when viewed from the top.

FIG. 18 is a partial sectional view of the push-pull connection between the collective pitch adjusting system and the pilot's command system, taken along section line 18—18 of FIG. 1.

DETAILED DESCRIPTION OF THE INVENTION

The present application being a CIP of my previous referenced application which resulted in U.S. Pat. No. 4,650,400, the call out numbers used previously have been kept if and as applicable, for ease of reference. Elements of FIGS. 1, 8 and 9 are used again in the same capacity and role. The schematics and diagrams of FIGS. 13, 14, 16, 17 and 18 are generally applicable to the subject matter of the present disclosure. Included herein are those design features and construction arrangements which specifically pertains to the subject matter of the present invention.

Referring now to FIG. 1 of the present disclosure, the cyclic pitch acutating mechanism is shown including the root portion of a blade 11 connected to and held by hollow shaft 13 that is secured to rotating housing structure 9 by means of bearings 21 and thrust bearing 17 mounted between structure 9 and flange 15 of shaft 13. An axial control shaft 23 is used for adjusting the instantaneous pitch angle of the blade which independently includes both collective and cyclic pitch components. Shaft 23 is centered and axially guided in hollow shaft 13 by journals 25 and 27, and is connected to same by helical spline-and-ball mechanism 29. A portion 31 of the control shaft has straight axially-oriented splines which slide in matching female splines cut in the end portion of lever 35 which is caused to slide in the direction of arrow f and/or oscillate in the direction of arrow f'. Control shaft 23 is terminated by shank 24 connected to sliding ball 26 which is guided in cylindrical groove 28 cut in the wall of axial cam structure 22 along a generatrix of the conical surface of cam 22. A displacement of cam 22 in the direction of arrow $f_c$ causes shaft 23 to move in the direction of arrow f''. This causes a rotation of hollow shaft 13 by means of helical splines 29, without affecting lever 35. A swinging movement of lever 35 causes shaft 23 to rotate and in so doing forces hollow shaft 13 to rotate. Blade 11 may thus be caused to rotate independently by the unconcerted actions of control shaft 23 along the directions of its two degrees of freedom. A plurality of such blades are distributed evenly around rotating housing 9 and similarly actuated. Flanges 15 and thrust bearings 17 transmit the centrifugal forces exerted on the blades to housing structure 9.

FIG. 2 indicates how the angle of attack of a blade at the tip station must typically vary as the blade gyrates in order to keep the blade operating most effectively at maximum forward velocity of the helicopter. These variations of blade angle of attack are transformed and shown as theoretical cam contours in FIG. 3. Both curves and contours are identified and discussed in the following section.

A preferred embodiment of the present invention is illustrated schematically in FIG. 4. Rotating housing 9 is guided and held in its rotation by bearings 87 and 89, and vertically restrained by thrust bearing 85. All of these bearings are mounted in fixed housing 1 which is affixed to a craft frame by a plurality of structural members such as 2. A powered drive shaft 3 transmits the torque required to gyrate the blades about the central axis of command shaft 57, by means of bevel gears 5 and 7. Central structure 69 revolves with housing 9 but is permitted to slide along it by means of sliding ball bearing 71. Its balls ride along grooves cut axially on the cooperating wall surfaces of both housing 9 and structure 69. Phantom-line-contoured volume 50 indicates the locations of the control command mechanisms which are fully described in my previous cited application. The pilot sets the collective pitch and cyclic pitch (and orientation thereof) adjustments by means of input signals 83, 115" and 121" respectively, applied to mechanisms 50 so as to: (1) cause structure 69 to keep a pilot-fixed position along arrow $f_c'$, (2) cause central shaft 57 to keep a pilot-fixed position along arrow $f_p$, and (3) cause central shaft 57 to adopt and keep a pilot-fixed angular position along arrow $f_d$. Central shaft 57 is supported along its length by journals 97 and 98 attached to rotating structure 69, and by journal 99 mounted on fixed structure 1.

Phantom-line-contoured volume 100 houses the mechanisms that are part of the subject matter of the present disclosure. An input signal 95 representative of the craft forward speed applied to mechanisms 100 causes output signals 102 to be applied to cyclic pitch control cam system 101 so that cam 101 axial location is adjusted along a fixed position determined by a combination of pilot's action and craft flight velocity. The vertical position of cam 101 determines the horizontal position of stem/follower 148 which is guided by fixed journal 149 attached to housing structure 9. Stem 148 displacement is inputed into mechanism 200 shown in phantom lines which transforms this displacement into an oscillation of lever 35. The mechanisms represented by contours shown in phantom lines are described and discussed hereinunder in details.

The schematic of FIG. 4 thus summarizes how and why control shaft 23 axial and angular motions remain independent and are representative of: (1) collective pitch as adjusted by the pilot, (2) cyclic pitch orientation as adjusted by the pilot, (3) cyclic pitch cyclical variations as adjusted by the pilot, regulated by the rotating housing angular speed ω and corrected by the craft forward speed. FIG. 4 schematic drawing more clearly and readily indicates the various motions of components and relationships thereof than do the drawings of my cited application. This should greatly help a reader understand this more complex system.

FIGS. 5 and 6 indicate how the forward velocity of the helicopter affects the direction of the forward thrust component as the craft increases such velocity. The references cited above including my own previous application discuss the "crawling sideways" characteristics displayed by a helicopter having a sinusoidally-varying cyclic pitch. The curve and diagram of these two Figures are discussed in the next section.

The oscillating movement of lever 35 always remains unaffected and unimpaired by its sliding motion relative to the splined portion 31 of control shaft 23. However, this oscillating motion incorporates two basic components, each one being the result of one of two independent signals: cyclic pitch amplitude demanded by the pilot and automatic correction thereof by the craft forward speed V. The combining of these two signal inputs is performed according to two distinct design approaches: (1) using one single radial cam capable of displacing the end of one single follower in response to the compounded motion of all points on its actuating surface (FIG. 7), and (2) independently combining the displacements of the ends of two followers, one of each responding to the actuating displacement imposed by one corresponding cooperating surface of each one of two independent radial cams (FIG. 8).

Cam 101 of FIG. 4 is depicted in FIG. 7 as having two degrees of controlled freedom: direction parallel to arrow $f_r$ and direction parallel to arrow $f_y$. The end of stem/follower 102 is kept in contact with surface 103 of cam 101 by means which will become clear later. The vertical position of follower 102 is fixed, thus the displacement of stem 102 along the direction of arrow $f_r'$ is exactly that of contact point 0 with surface 103. Thus stem 102 motion is uniquely dependent upon the relative position of point 0 at any and all times with respect to fixed centerline-axis 104 of central command shaft 57. Point 0 describes a contour line on surface 103 as stem 102 revolve around axis 104 as indicated by arrow f. Surface 103 consists of an infinity of such contour lines located in an infinity of corresponding parallel horizontal planes orthogonal to axis 104 and having fixed relative positions with respect to one another.

The distance R between point 0 and axis 104 which determines the motion of stem 102 is thus function of: (1) the angular position of point 0 in the plane of its contour line with respect to a reference vertical plane which will be assumed to be the third plane orthogonal to both previously mentioned planes and passing through centerline 104, and (2) the vertical displacement which may be imposed on surface 103 or cam 101. Cam 101 is slidable on splines 105 cut on the cylindrical surface of inclined shaft 106. Shaft 106 is fixed on central shaft 57 and locked by key 107 so as to impose all movements of shaft 57 on shaft 106. Because of the obliquity given to splines 105, any and all vertical displacements imposed on cam 101 cause it to move sideways also as will be obvious to readers familiar with the art.

The vertical motion of cam 101 is controlled by action on its supporting structure 108 which includes two parallel flanges 109 and 110. These two flanges are kept separated by two flat ball bearing arrangements 111 and 112 from a flange structure 113 attached to a collar structure 114 that can slide by means of splines 115 on central shaft 57. Collar 114 is connected to cylinder/piston assembly 116 by a plurality of structural members 117. Cylinder 116 houses double-piston assembly 118 on which it can slide. In turn, double piston 118 is allowed to slide on central shaft 57. At its bottom, double piston 118 is connected by means of cylinder 119, flange 120 and a plurality of structural members 121 to rotating housing 9 that has a fixed vertical position. Flange 120 is thus vertically fixed but can not rotate with respect to either piston assemblies 116 or 118, although housing 9 rotates.

Referring back to the drawing of FIG. 4, structural members 121 must connect volume 100 where the piston and cylinder assemblies are located to rotating housing 9 through structure 69. This is accomplished by connecting cam 22 structure to structure 69 by a plurality of structural members 122. Structural members 121 pass between structural members 122, thus traversing structure 69 without interference. The relative rotation of housing 9 with respect to structural members 121 is asssured by means of annular flange 123 secured between flat ball bearings 124 and 125 which are restrained vertically by circular structure 126 and housing 9 structure.

The reader will now understand how the axial non-rotative motion of the piston assemblies 116 and 118 is made possible. Such displacement of piston assembly 116 results from the action of two opposing forces: (1) one exerted on the differential annular surface corresponding to $(D'-D'')/2$ by the pressure of oil inside volume 127, and (2) the other developed by compression spring 128 which tends to separate flange 129 from fixed collar 130; whereas the oil pressure tends to bring them together. The oil or hydraulic fluid is introduced by means of duct 131 which reaches the bottom end of central shaft 57 where it is connected to a pressurized oil feed line. The oil enters constant volume 132 to form where it may enter variable volume 127 between the two pistons. The reader will understand how a given pressure level applied in volume 127 results in one well determined axial position of piston 116 with respect to piston 118, or to rotating housing 9, used here as frame of reference for vertical displacements, or to shaft/cam 106, for any given set vertical position of central shaft 57. Such vertical displacement of piston 116 produces the same vertical displacement of surface 103. Thus, for any and all set vertical adjustments of the cyclic pitch control, without affecting it, a second signal can be superimposed thereon by adjusting the pressure of the hydraulic fluid in duct 131. This pressure can be made to vary as the indicated craft forward speed which results in the displacement of stem 102 also varying with the detected helicopter forward velocity.

An alternate invention embodiment as shown in FIG. 8 uses the same double piston assemblies to operate a second cam 140 in addition to cam 141. The vertical displacement acutating means of cam 140 needs no further description. The two signals combined in one cam previously (FIG. 7) are handled by two separate cams moving axially independently of one another, but angularly together. To that effect, each cam controls the axial displacement of a similar follower/actuator mechanism. The sensing element of this follower consists of a ball 142 (or 142') establishing permanent contact with its associated cam at point 0 (or O'). The ball is loosely lodged in an open restraining cavity having an internal spherical wall surface 143 of diameter slightly larger than that of the ball so as to permit the ball to move away from the circular lip 145 of socket 144. When it does so, a small annular opening is created between the ball surface and surface 143. When the ball is pushed against the lip, the opening closes. Small grooves 146 are arranged star-wise on the back surface of the socket wall so as to enable oil to flow out when the ball is pushed back. The oil is channelled by duct 147. The actuating mechanism of the follower is described later. Suffices it to state now that, when point 0 is caused to move outwardly*, ball 142 moves deeper inside cavity 143, which causes a drop in the pressure of the oil, forcing socket 144 to move away also. Vice versa, when point 0 is caused to move inwardly, ball 142 closes with respect to cam surface 180 the lip gap opening and the oil pressure rises, which causes socket 144 to move toward shaft 57 axis. Thus, both balls 142 and 142' are constantly and continuously urged to rest against their respective cam surfaces.

Cam 141 and its control surface 180 move up and down with central shaft 57 along the direction of arrow f, as imposed by the pilot's command for adjusting the cyclic pitch, hence the desired craft velocity. Surface 180 does not rotate, but in its rotation, housing 9 causes point 0 to follow its path on surface 180 along the direction indicated by arrow f'. The cooperating follower mechanism thus moves in and out along the direction of arrow $f_r'$ so as to actuate a slot cam described later. The follower assembly is guided by structure 148 affixed to rotating housing 9 by means of axially oriented splines 149. This motion is representative of both the magnitude of the cyclic pitch and variations thereof as a result of the angular position of housing 9 relative to the position of central shaft 57. The first control signal uniquely dependent on cyclic pitch is thus generated by first radial cam 141 as a function of both pilot's demand and blade gyrating location.

The cam follower system controlled by second cam 140 is not shown in FIG. 8 because it is identical to that already illustrated, only touch ball 142' is shown. The mechanism is supported and guided by structure 148, as previously described. The operation and motions of ball 142' and point 0' are similar to those just described. However, cam 140 can slide on central shaft 57 in the direction of arrow $f''$ as urged by piston-cylinder 116 of FIG. 7 by means of members 117 that move according to arrow $f_o''$, as earlier described. Thus control surface 180' of cam 140 is positioned vertically according to the helicopter actual forward velocity, at any and all times. The follower mechanism controlled by ball 142' thus moves in the direction of arrow $f_v$ as a result of the craft forward speed, constituting thereby the second signal generated. As compared to the operation of cam system 101 of FIG. 7 in which the combining of the two signals occurs within the cam system, cam system 140-141 of FIG. 8 does not combine these two signals. Such signal combination is performed by another set of mechanisms which are described hereinafter.

First, the operation of the follower mechanisms must be described in details. Such a "powered" follower mechanism may also be used in the case of FIG. 7 in which, for the sake of expediency, a stem and roller assembly is depicted, as is the case of the constructions described in my cited application, for ease of reference. The operation of ball 142 in its socket 144 was earlier described and discussed, but the explanation as to why the socket follows the ball movement was postponed. It is embodied in the drawing of FIG. 9 and illustrated by the curve of FIG. 10 graphic. Each follower system is powered in the sense that large forces can be handled by it whilst only a set small fraction thereof is exerted at point 0 (or 0') by the touch ball on surface 180 (or 180') of cam 141 (or 140). The designation "touch ball" is deserved inasmuch as, theoretically, "touching" the ball will cause the following member to move. To that effect, socket 144 is an extension of shaft 150 which consists of three parts: (1) splined segment 151 for axial support and guidance, (2) part 152 (not shown here, but described later) which performs a specific function for a given follower system, and (3) power piston 153 for powered actuation. Hydraulic fluid duct 147 is connected to duct 154 by an external connecting tube 155 which circumvents the structure of part 152. Piston 153 slides in cylinder 156 mounted on rotating housing 9. Hydraulic fluid (or oil) under pressure is supplied by duct 157 into small chamber s, from which it may flow into large chamber S through restricting orifice 158. From chamber S, the oil may flow unhampered to cavity 143 from where it may escape through the variable size orifice formed between touch ball 142 and lip 145.

When the gap opening between the ball and the lip is maximally open, a pressure drop occurs in restricting orifice 158 and the pressure inside chamber S drops, assuming a constant supply pressure $P_1$, the force $P_1 \cdot \pi(D^2-d^2)/4$ exerted by the oil in chamber s becomes larger than the force $P_i \cdot \pi D^2/4$ exerted by the oil in chamber S on the piston (neglecting the influence of $\tau$, area within lip 145 circle) and shaft 150 retracts away from the cam surface. However, when that surface advances toward shaft 150, the reverse happens, the oil flow through restricting orifice 158 stops because ball 142 has closed the gap opening, the pressures across the piston are equal and a net force $P_1 \cdot \pi d^2/4$ pushes the powered shaft against the cam, which tends to cause the reverse process. This could go on forever, as it would if the system were given an opportunity to become unstable, a well-known occurrence in unstable servo-mechanism operations. The dampening effects of seals 159 and 160 friction, and of ducts 154, 155 and 147, combined with the constant axial motion of point 0, suffice to stabilize the motion of shaft 150 which never ceases.

The curve of the graph of FIG. 10 indicates how intermediate pressure $P_1$ varies between two extreme pressure levels $P_{max}$ and $P_{min}$ as a function of the ratio of area $A^*/A$, where $A^*$ is the effective area of restricting orifice 158 and A represents the variable area of the gap opening created by the movement of ball 142 with respect to lip 145. Practically, the orifice sizing is such that A varies between $A_1$ and $A_2$ corrresponding to points a and b of the curve and pressures P" and P'. The segment a-b of the curve is quasi linear in the range of interest. The reasons for accepting the additional complexity of such a system are fully discussed in the next section and will be obvious.

Part 152 of the follower mechanism not shown in FIG. 9 differs according to the use made of it. Such uses are made apparent in the drawings of FIGS. 11, 12, 13, 14, 15, 16 and 17. In essence, two sliding motions must be combined into one oscillating motion which incorporates the effects of both sliding motions without cross-coupling while enabling them to act independently. The common element is lever 201 which has two controlled and limited degrees of freedom: rotative per arrow $f_o$ and linear per arrow $f_a$ (FIG. 11). The rotation about the axis of the cyclic pitch control shaft 23 is unhampered and unaffected by the sliding motion because of axially-oriented spline connection 31', as described in FIG. 1 between lever 201 and 35 and portion 31 of shaft 23. Conversely, no feedback exists between any axial displacement of control shaft 23 and those elements which cause lever 201 (35) to oscillate.

The pilot inputed cyclic pitch signal causes shaft 150 to assume a set axial position for any given cyclic pitch adjustment. Part 152 position is then fixed. A given forward velocity of the helicopter similarly sets the axial position of part 152'. The operation of each part 152 and 152' needs now be described. The top end of lever 201 is equipped with a roller 202 that is free to move along guiding slot 203 cut through part 152 structure. Slot 203 is obliquely oriented with respect to the axis of shaft 150 so as to permit the maximum orthogonal displacements X and Y of roller 202 as shaft 150 performs a full stroke excursion (FIG. 14). Therefore, any axial motion of shaft 150 causes a lateral motion of roller 202 and of lever 201 end, thus generating the oscillating movement of lever 201 which is prevented from moving axially by restraining part 152' of shaft 150'. Conversely, if the helicopter forward velocity varies, shaft 150' moves axially and either one of the two push plates 168 and 169 pushes on lever 201 by means of one of either flat ball bearings 171 or 172, as the case may dictate. Lever 201 then slides on splines 31' and assumes the position imposed by shaft 150', hence by the helicopter velocity. However, in so doing, roller 202 is forced to move in the direction of arrow f (FIG. 17), though part 152 (slot cam) position is fixed, as earlier explained. Because of the obliquity of cam slot 203, lever 202 has no choice but to rotate about control shaft 23 axis to accommodate the situation, rotating control shaft 23 in the process. As a consequence therefrom, the cyclic pitch adjustment of the blade is altered accordingly. During that process, however, the relative position of ball 142 with respect to cam 141 is not affected. In conclusion, the axial motion of either one of shafts 150 and 150' can be adjusted without altering the axial position of the other, but the cyclic pitch control shaft 23 must conform to the position constraint imposed by the combination of the two restraints as described, at all times. Thus, for any given combination of: (1) cyclic pitch adjustment command, (2) blade angular position with respect to the helicopter frame, (3) helicopter forward velocity, and (4) set axial position of control shaft 23, there can be only one single unique very well defined angle of attack of that blade at a fixed station along the blade span.

It was earlier explained that one given axial position of control shaft 23 corresponds to one collective pitch adjustment. An axial displacement of cyclic pitch control shaft 23 to vary the collective pitch, thanks to splines 31', can in no way affect either a set angular position of lever 201 or its axial location. The instantaneous adjustments of the collective pitch by the pilot, of the cyclic pitch by the pilot also and of the cyclic pitch variation by the helicopter forward speed and by the blade position in its gyrating motion are all singularly and independently coordinates and brought about automatically. The next section discussed the aspect of cam designs and helicopter response thereto.

The aerodynamic moments exerted on the blade are transmitted to hollow shaft 13, then to helical splines-balls-splines 29 and finally to both ball 26 (axial component only) and particularly lever 35 (201) through splines 31'. These moments are large and their handling results in resisting large forces. This aspect of the present invention construction requirements is important as it sets forth design limitations which cannot be ignored. A most obvious and critical limitation is that which was already mentioned earlier: i.e. a cam/follower mechanism cannot be expected to absorb and/or resist the bulk of such forces; hence the servo-mechanism described in FIGS. 9 and 10. The exact positioning of parts 152 and 152' must be assured repeatedly regardless of the loads applied thereon, for any given position of shafts 150 and 150' respectively. Causes of initiating component and/or part vibrations must be eliminated. For that reason, shafts 150 and 150' must be solidly supported in their axially sliding motions. Each shaft is laterally solidly secured near the piston end, the other support is structure 148 rigidly affixed to rotating housing 9.

Shaft 150', by its nature, can transmit axial loads only and for that reason is the farthest removed from the anchoring of structural member 148 onto housing 9 structure. However, the torque required to balance the aerodynamic moment earlier mentioned in addition to any actuating excess torque needed can only be generated by a force laterally applied by part 152. The balancing force needed to counteract such lateral force is provided by control shaft 23. Cam 22 and helical-spline ball-bearing 29 cannot and should not be expected to contribute significant side-load absorption ability for reasons which a reader familiar with the art will readily understand. Journals 25 and 27, and their respective structures 49' and 49 are intended to assume this side-load carrying ability and to provide support and guiding rigidity. Structure 49' must by necessity be attached to the blade hub or hollow shaft 13. Structure 49 can be mounted on flange 15—thus part of the blade hub—or extend out to reach housing 9 structure. Further elaboration on the advantages and drawbacks of each design approach is beyond the scope of this disclosure. Yet, it is evident that provisions can easily be made to insure that a strong and rigid support can be given to control shaft 23, in either instance.

Structural member 148 remains the keystone of this mechanical architecture. The distance between the axis of shaft 150 and the bottom surface of housing 9 structure can be made short. The length of the attachment base of member 148 can be made wide, as shown by phantom lines 148' (FIG. 12). The structure of member 148 may be given some curvature as depicted by phantom line 148" (FIG. 11). The combination of such design features will render structural member 148 and its anchoring very strong and rigid. Needless to say, the structure of rotating housing 9 must be very rigid for other various reasons and the positioning of the axes of shafts 150' and especially 150 with respect to the axes of both central shaft 57 and control shaft 23 can also be rendered practically insensitive to loads imposed on the blades.

Another aspect of the present invention construction, as described so far, has not yet been fully investigated, that of functioning. It is self-evident that each moving part and/or component located inside rotating housing 9 cannot interfere or be interfered with by any other moving and/or fixed part and/or component. Such design requirement is particularly emphasized by the functioning relationship which structure 69 supporting cam 22 is to have with structural members 121 supporting double-piston assembly 119. In order to clearly delineate the design problem and thus more readily identify possible design solutions, the design requirements should first be set forth. They are:

1. cam 22 must rotate with housing 9 structure:
2. housing 9 structure must rotate freely with respect to structure 1 and any fixed attachments thereto;
3. double-piston assembly 119 must conserve a fixed vertical position at any and all times; and
4. cam 22 should only handle radially-oriented and/or vertically-oriented loads.

The above requirements are absolute, except for 4. possibly. The following are less stringent requirements and referred to as desirable features. They are:

1. double-piston 119 should not rotate continuously with respect to central shaft 57, but remain rotationally still (seals);
2. the interior volume of rotating housing 9 should be sealable;
3. the number of thrust ball-bearings additionally incorporated in the invention construction should be minimized; and
4. double-piston 119 should be allowed some rotational degree of freedom, up to possibly 45°, in the case of FIG. 7 construction (single compound cyclic pitch cam).

The desirability of these design features is discussed in detail in the following section.

Considering that the general design features of the either preferred or imposed construction configurations of the present invention are those illustrated in the drawings already described, the number of design options available is necessarily limited and two preferred constructions are worthy of further investigation. They are basically defined as indicated below in the form of a table for ease of understanding and comparison.

TABLE A

| Single Thrust Bearing Design | Dual Thust Bearing Design |
|---|---|
| Cam 22 mounted on structure 69 which rotates. | Cam 22 mounted on thrust bearing and structure 69 not rotating. |
| No fixed structure traversing rotating structure 69. | Fixed structure traversing wall of structure 69. |
| Double-piston 119 attached to fixed structure 1. | Double-piston 119 attached to rotating housing structure 9. |
| Thrust bearing provided between double-piston and structure 1. | Thrust bearings provided on cam 22 and on housing structure 9. |
| Double-piston 119 may rotate without limitation. | Double-piston rotation limited but more than adequate. |
| Housing 9 sealing possible. | Housing 9 sealing possible. |
| No interference between housing 9 and structure 1. | No interference betweeen housing 9 and fixed structure 1. |
| Double-piston 119 vertical position fixed by structure 1. | Double-piston 119 vertical position fixed by housing 9. |
| Thrust bearing rotating slowly intermittently. | Thrust bearings rotating at full angular speed continuously. |

The construction of the first design option is represented in the drawings of FIG. 4. The construction of the second design option can be addequately described in the text. Structural members 121 extending down from double-piston 119 cross structural members 210 extending down from circular collar-shaped structure 211 which constitutes the support for thrust bearing 212 and bearing 213 to support cam 22 radially and axially. Members 121 are attached to annular flange 214 which is centered between double thrust bearings 215 and 216. These two bearings are mounted on housing 9 structure by means of retaining lodging 217. Seal 218 closes the annular space between structure 69 and housing 9. In this design configuration, rotational excursions about shaft 57 axis are limited to the amount of rotation which may be given to structure 69 which itself needs not be limited, plus possibly up to 45° of allowable angular play available between members 121 and 210. The balls of bearing 71 do not ride in grooves and are restrained only by their retaining cages. Cam 22 rotation is urged by the minimal torque required to overcome the bearing drags and/or the inertial forces developed during transient operating conditions (inertia of cam 22 mass). Such torques require lateral forces that are negligible compared to those which were described earlier. The structure of cam 22 is circular and most likely radially loaded at three (3-bladed rotor) to six (6-bladed rotor) equidistant points. The cam structure is also supported radially at the top by bearing 213 that gets support from collar 211 structure, easily reinforceable inwardly at its top.

The second design option (alternate preferred embodiment) disposes of bearings 212 and 213, cam 22 and collar structures are joined. The strength of cam 22 is no longer in question. Structure 69 rotates with housing 9, balls of bearing 71 ride in grooves cut along generatrices on both the internal surface of housing 9 wall and the external surface of structure 69 wall so as to drive cam 22 with housing 9. Seal 218 cannot so easily seal against a gooved surface, but the seal only slides and limitedly at that. Obviously, journal bearings 97 and 98 and their respective supporting flange-like members attached to structure 69 must then be removed to allow structural members 121' (shown in dotted lines) to come down to reach structure 1, internally to rotating structure 69. Because double-piston 119 is securely guided by central shaft 57 and only vertical loads are applied on structural members 121', the apparent frailty of these members should be of no concern. If limited rotation of double-piston 119, is deemed necessary, a thrust bearing of the type already shown can be located at locations 219 or 220, whichever is most convenient.

In the design of all constructions, an attempt has been made to isolate the aerodynamic loads exerted on and transmitted by the blades from those parts and/or components that carry signals from the pilot. According to this design rationale, in the case of the second design option just described, it might prove advantageous to provide support to rotating structure 69 at its upper station as shown in dotted lines by a journal bearing 222 and a cooperating supporting member 223. The reader must keep in mind that the aerodynamic loads exerted on and transmitted by the blades vary between blade in forward flight in an alternating fashion. The cantilevered arrangement of rotating structure 69 would otherwise impose excessive lateral loads on bearings 71 and structure 69 walls. Central shaft 57 can be made very strong and is supported close by, at its top 224.

Finally, oil or hydraulic fluid under pressure must be supplied to cylinders 156 (one set of two per blade) and to space 127 (one total) for piston actuation. Although it could be argued that one supply source could suffice, this may not prove the most advantageous approach. Oil supplied to cylinders 156 (cam shaft) is allowed to escape inside the rotating housing and can be used to lubricate surfaces between various moving parts. The hydraulic fluid in space 127 is not allowed to leak because of the requirement for controlling the pressure therein. It is more logical to assume at this juncture that two separate supply sources of oil are provided. Space 127 is supplied by duct 131 and cylinders 156 are supplied by duct 147. Although shown on separate Figures, all central shafts 57 shown in this disclosure have two oil supply ducts running inside the shafts. The schematic drawings of FIG. 4 shows by means of two short arrows 0' and 0'' where the two ducts receive their oil supplies.

FIGS. 8, 9 and 11 indicate how the oil is channelled to cylinders 156. Duct 147 extends to the upper end of central command shaft 57 where oil enters chamber 230 designed for accommodating axial displacements of shaft 57. From there ducts such as 161 or 161' channel the oil to cyclinders 156 by following the wall of rotating housing 9 for joining with ducts 157. Oil is of course permitted and urged to flow through the ball/lip gap openings as servo fluid. This certainly facilitate the rolling of balls 142 and 142' in their sockets, as does ink in ball-point pens. The ball/cam contact points 0 and 0' where punctual pressure is exerted thus obtain first hand lubrication. Hole 231 serves to vent closed variable-volume space 232 in case the clearance between shaft 57 and its guiding bore surface is inadequate.

The sizes of actuating piston/cylinder assemblies and the pressure levels of interest are discussed in the following section. The sealing of the volume inside structure 69 needs no further elaboration, except to state that oil which penetrates inside that space drains on flat surface 234 acting as oil pan to collect oil in space 235 from where it may be evacuated. Again, the pilot's control signals 99, 115'' and 121'' and their connections with the actuation of central shaft 57 and structure 69 are similar to those described in my cited application, and are well known to those familiar with the art.

OPERATION AND DISCUSSION

My previous application and the two prior art references cited describe and discuss the reasons that cause two basic unique phenomena representating so well the behavior of helicopters duing forward flight. They are the influence of the craft forward velocity on the response of the helicpter to a sinusoidal cyclic pitch variation and conversely the absolute need for means of adjusting such variations as a function of forward speed. Such phenomena and the methods of correction thereof are well known to readers familiar with the art. The end results are presented in FIGS. 5 and 6. With the blades gyrating at an angular velocity $\omega$ and the craft moving at at velocity $-V$ that also represents an airstream speed V with respect to the blades, from the time the pilot decided to leave the hovering position by adjusting the cyclic pitch forward, to the time the craft reaches velocity V, either one of two things occurred: (1) when velocity V is reached, the craft flies in a direction which makes an angle $\psi$ with respect to the direction that the pilot wanted to follow originally; or (2) the pilot kept adjusting the side position of the cyclic pitch stick as the craft accelerated by a total angular amount $\psi$. The curve of FIG. 6 indicates how angle $\psi$ had to be adjusted as the craft reached higher and higher indicated speeds. Because the second case is the only one of practical significance and value to the pilot, this is just what he did.

In addition, as the helicopter accelerated forward while such cyclic pitch adjustments were being made, the pilot had to contend with another phenomenon up to a certain speed: i.e. the increase in lift which the blades provide as the helicopter picks up speed. If the pilot desired to maintain altitude during the craft accleration, he had to reduce collective pitch and engine power, because of the increase in lift which the blades generate as the airstream acts on the advancing blades. Then later, as the helicopter reached higher indicated speeds, because of the inefficiency of the blade disc operating as a wing and of the increasing air drag, the pilot had to increase the engine power and adjust the collective pitch. During all of that time, the pilot was obviously kept very busy, compared to what typical airplane takeoffs require. Furthermore, the azimuth of his craft was constantly shifting, unless it was continuously readjusted. Relieving the pilot of such strain and need of attention has been the object of constant efforts on the part of helicopter designers.

In addition, as the craft accelerated forward and the air velocities relative to various blade airfoil sections spanwise increased for advancing blades and decreased for retreating blades, the aerodynamic forces exerted on such blade sections which vary as the square of velocity became even less balanced between the advancing and the retreating sides. A rolling moment exerted on the craft resulted, which explains the seemingly instability that characterizes helicopters during the accelerating phases of their forward flight. Thus it appears that the sum total of all cyclic pitch variations, on both sides of the collective pitch setting, of the blades cannot be equal, but that the sum total of the corresponding aerodynamic forces which they experience must be equal if no rolling moment is to be developed. This means that retreating blades must exhibit a high angle of attack for a longer relative duration (or larger angular blade displacement), inferring that advancing blades should either exhibit smaller angle of attack variations and/or for shorter durations. Arcidiacono summarizes this in the solid line curve of FIG. 1 of his U.S. Patent, such curve being approximately reproduced by curve ① of FIG. 2 graphic illustration, as presented in the present disclosure.

Arcidiacono also contends in his patent that the increase of blade tip angle of attack required at high craft speeds of a retreating blade reaches the stalling point sooner than it is desirable, thereby limiting the maximum forward speed that the helicopter would otherwise be capable of. The corollary being that, at such maximum speed limit, the helicopter could otherwise carry a larger payload. Either way, a penalty results. These are very convincing arguments that a sinusoidal cyclic pitch incursion of the angle of attack of the blade on both sides of the collective pitch adjustment of said blade is inappropriate. Furthermore, at the minimum value of its cyclic pitch variation, the angle of attack of the tip section of an avancing blade may become negative briefly. The end result is a source of highly undesirable blade vibrations which are generally unacceptable.

Theoretically it would thus be advantageous to cause the blade of an helicopter to vary the angle of attack of the outer portion of its span, as a function of its angular position around the disc axis of gyration, according to a programmed manner that differs appreciably from the sine wave representative of a swash plate operation. Such simple swash plate action produces a sinusoidal variation depicted by curve ② of FIG. 2. It is obvious that curves ① and ② differ appreciably. Incidentally, it may be pointed out here that a circular-shaped cam contour off-centered with respect to its axis of rotation, such as circle ①* displaced a distance $\delta$ from its neutral position (center 0*), actuating a follower $\Delta$ from 0' to 0'', as shown in FIG. 3, does not generate a sine wave, but a curve such as ③ in FIG. 2. Conversely, the cam contour required for generating a sine wave corresponds to contour ③ of FIG. 3.

In FIG. 2, another curve is of interest. According to Arcidiacono, curve ④ represents the ideal variation of blade angle of attack at stall as a function of blade angular gyrating position. Curve ⑥ is the stall pitch angle at negative lift position. This indicates that a blade angle of attack distribution as indicated by curve ① results in a stall region ④', which is undesirable. Also, it is not practical to expect a cam system to generate an axial displacement of the follower with no angular displacement of the cam-portion ④'' of curve ④. A compromise must obviously be reached whereby: (1) the extent of stall, and (2) the amount of rolling moments, are minimized as the blades gyrate in a plane to form a disc orthogonal to the axis of gyration. The means for embodying such compromise consists of a cam in the construction suggested by Robertson (U.S. Pat. No. 3,756,743) and of a second swash plate in the design solution offered by Arcidiacono (U.S. Pat. No. 3,031,017). In both construction, a first harmonic (sine wave) is obtained by conventional means—articulated psider (Robertson) and swash plate (Arcidiacono). Then another cyclic pitch variation is superimposed on and combined with the first harmonic: i.e. second and third harmonic (Arcidiacono) variations generated automatically by the second swash plate programmed variations generated by a cam/follower system which responds to the blade angular position automatically and to either craft speed or pilot's command (Robertson).

Thus theoretically for a given helicopter and blade construction, Arcidiacono offers an approximate solution which can be optimized for one craft velocity (supposedly the maximum speed), Robertson offers the potential of an exact solution for all velocities of the craft. For ease of understanding and representation sake, it will be assumed hereinafter that curve ⑤ illustrates the optimum variation of angle of attack at maximum craft speed and which provides the best compromise (FIG. 2), and that corresponding cam contour ⑤ of FIG. 3 represents said curve in polar coordinates. At various forward velocities of the helicopter, other intermediate ideal cam contours are required. Such intermediate contours are angularly arranged and relatively positioned so as to incorporate the angular azimuth orientation variation depicted by the curve of FIG. 6. In the present invention in which cam profile and cam contour variations are used for adjusting the cyclic pitch distribution, a specified family of cam profiles and contours may be combined and shown in FIGS. 7 and 8 by curves such as A, B, C and D of FIG. 7, and G, H,I, J and K of FIG. 8. For the sake of simplicity and convenience, these profle curves are assumed to correspond to cam profiles at different angular positions of planar sections such as that indicated by section line A—A of FIG. 3. Such description is given for illustration purpose only. For ease of reference, it will be assumed that, at their zero-forward-velocity positions, all cam contours are circles centered on central shaft 57 axis, i.e. points $\tau$, $\tau'$ and $\tau''$ of FIGS. 7 and 8, respectively.

In the single cam configuration of FIG. 7, profile curves A, B, C and D are radially displaced as the amount of cyclic pitch demanded by the pilot varies. Thus their shapes can be determined to be ideally optimum for only one fixed condition. It is assumed that such condition exists when the cyclic pitch set by the pilot (demanded speed) remains steadily fixed and the actual speed reached by the helicopter is that which the pilot demanded. A steady forward flight condition then exists. It is evident that during transient flight periods—craft accelerating or decelerating—that condition cannot be realized and that the follower axial displacement responds to a cam contour offset with respect to an idea different contour which will be reached when the helicopter has reached the new steady forward flight condition. In addition, if the cam contour corresponding to point $\tau$ is a circle, which it must be so as to insure that during hovering the cyclic pitch vriations remain nil, circle $\tau$ moves sideway when the pilot demands a brusque increase in cyclic pitch (demanded speed) and the cyclic pitch distribution becomes that which is represented by curve ③ of FIG. 2 (slightly non-sinusoidal).

In the case of the construction shown in FIG. 8, the cyclic pitch cam profiles may be shaped so that curves E and F for instance represent the gradual contour shape shift which occurs between circle ② and contour ③ in FIG. 3 when the pilot cyclic pitch demand increases brusquely from 0 to maximum. Thus, at the start of the craft acceleration forward, the cyclic pitch distribution remains sinusoidal until an increase in craft forward velocity alters the character of that distribution. This is not possible with the single cam system of FIG. 7, obviously.

As the helicopter accelerates forward in response to the cyclic pitch distribution imposed by the pilot, the speed controlled cam moves down and cam contours corresponding to profile curves H, I, J and K come into play in response to actual indicated forward craft speed. Each one of these contours and profiles are shaped to reflect the contour corrections brought about by profile curves between E and F. Thus, during transient conditions, acceleration periods for instance, until the actual craft speed reaches the demanded speed, the cam contour corrections brought about by the profile shifts from curve E to curve F slightly differ from those which the cyclic pitch demand imposed by the pilot generate. As compared to those of the previous construction discussed, these deviations from the ideal are small. This constitutes a minor drawback of the dual cam system, of much lesser importance than that of the previously discussed construction.

Although the signals generated by cams 140 and 141 are combined before the results of the combination thereof are transmitted to hollow shaft 13, hence to blade 11, it is evident that two factors intervene in the signal transmission and combination between balls 142 and 142', and cyclic pitch control shaft 23. These factors are caused by lever 201 angular rotation about control shaft 23 axis which does not vary perfectly linearly with axial displacements of follower shaft 150. Also, the contact points between rollers 202 and the walls of slot 203 move slightly vertically as lever 201 oscillates. The curvature given to slot 203 of part 152 can be shaped to cancel out the sum total effect of the combination or compounding of these two factors. Furthermore, the curvature of slot 203 can be adjusted to incorporate the influence of other factors, including corrections to the shape of cam 141, as and if needed. Lever 201 of course has no other choice but to move exactly as shaft 150' or as the signal imposed by cam 140'. The same two factors discussed above affect the transformation of the axial motion of shaft 150' into an oscillating motion of lever 201, in the same manner and for the same reasons, and the corrections therefor are those just mentioned.

Therefore it may be stated that angular rotation of control shaft 23 can be made exactly proportional to the combined radial displacements imposed independently by cams 141 and 140 on their respective followers. In the case of the construction of FIG. 7, because a single follower is used, if its axial displacements are transmitted directly by a mechanism such as that used with cam 141 of FIG. 8 to control shaft 23, with the appropriate corrections of slot 203 curvature discussed earlier, the rotational movements of control shaft 23 also faithfully represent the radial signal generated by cam 101. The exact contour and profile curves of all cams must first be calculated and then further refined experimentally for a given helicopter and blade configuration and construction. Once the steady-state operating characteristics of both have been determined and incorporated in the cam and slot 203 designs, the blade angle of attack variations may truly follow the optimized distribution that will theoretically guarantee the highest performance of that helicopter whilst minimizing rolling moments and blade vibrations. The potential causes of practical limitations can now be discussed.

Influence of Practical Limitations and/or Causes of Errors

These practical limitations and/or causes of errors are those which are inherent to and/or the results of the designs and constructions of the invention embodiment.

They pertain to built-in sources of imperfections in the operation of positioning components. The influence of such causes of imperfections as tolerances on part dimensioning, part deformations, errors on part positioning and aligning, etc . . . is beyond the scope of such disclosure, although it could play a vital role. The importance of the rigidity of critical structural components mounted on and located within rotating housing 9 is described in the previous section. The structural shell of housing 9 can easily be rendered very rigid, but it must also retain its position with respect to fixed structure 1 during its rotation. Housing 9 transmits all blade disc loads by means of bearings 85, 87 and 89. The moments exerted on the disc impose large forces on these bearings. Any play and/or deformations permitted by these bearings and/or the structures supporting them translate into unwanted displacements of the followers and ball 26 with respect to their cams. Such displacements would cause unwanted and erroneous variations of the cyclic pitch distribution. Extreme precautions must be taken to minimize such "noise" displacements. To that effect, structure 1 may be extended by structure 1' (shown in phantom line) so as to allow the use of an additional bearing 89', which would greatly laterally stiffen the rotating mounting of housing 9 and contribute to eliminating the just mentioned potential problem.

Assuming that fixed housing 1, the rotating mounting of housing 9, housing 9 and the actuating system of the blade pitch angle behave as undeformable components with perfect dimensioning and relative positioning (ideal nominal system), the hydraulic actuating systems of the craft-speed responsive cam and of the servo-powered followers exhibit inherent sources of errors which must exist because of the very essence of their nature. The vertical positioning of piston/cylinder 116 and of pistons 153 is determined by an equilibrium being maintained between two opposing forces which must constantly result in a nil net force being applied on the piston. The net force is affected by the friction that exists between moving parts. In the case of piston/cylinder 116, two seals exert a drag force opposing the part motion. In the case of pistons 153, two seals also play such a role. In all cases, another factor plays an important role: the seal deformation which varies as a function of the motion direction. The effects of both factors compound and result in a load-position "hysteresis" which generally causes at best an uncertainty in the exact component positioning and, at worst, an instability in a servo-mechanism loop (case of pistons 153).

O-rings are shown in the drawings of FIGS. 7 and 9 for the sake of illustration. This type of seal is effective but completely inappropriate for the present application. Sealing-lip type seals are much more suitable. They are well known to readers familiar with the art and need no further elaboration. It is believed that their use will minimize the influences of the two factors previously mentioned, to an extent such that they may be ignored practically.

A servo-mechanism (pilot-valve type) could also be used to control piston/cylinder 116 in response to a mechanical signal system housed in central shaft 57 and activated from its bottom end. The use of a spring (128) is deemed simpler though satisfactory in the present instance. The low hysteresis of a high-quality steel spring should result in negligible positioning errors. Thus the adjustment of the hydraulic pressure remains the only source of error. Because the aerodynamic forces exerted on the blades vary as the square of the craft indicated airspeed and controlling a hydraulic pressure proportionally to a sensed pressure is rather straightforward and simple, the hydraulic pressure in chamber 127 will be assumed to be proportional to $V^2$, for the purpose of this discussion. For helicopters operating mostly at higher altitudes, such simplicity might not provide adequate craft-speed adjusting of cams 101 or 140. In such operational cases, it will be better to cause the hydraulic pressure to vary as V or $V^2$, but where V is first calculated and then used for adjusting the hydraulic pressure accordingly. Regardless of the approach used, the error introduced by a spring-and-pressure system in the positioning of velocity-responsive cams is largest in relative value at low craft speeds, when the adjustment is least critical.

In the high velocity range of the helicopter, hydraulic pressures in the range of 1,000 to 2,000 psi can easily be regulated within 10 psi, which represents a relative error of about 1%. In terms of error on the cam positioning, this corresponds to possibly half of this for the velocity error, which is negligible. The piston positioning uncertainty error due to friction could be as much as twice this amount. Thus it is estimated that, in the upper velocity range, the cam position can be maintained within 2 to 3% of the nominal ideal position it should occupy for a given indicated airspeed. In the lower velocity range, that error could easily reach 10%. As a matter of fact, spring 128 could be preloaded at its extended position in such manner that both velocity and hydraulic pressure must reach threshold values before piston/cylinder 116 begins its upward movement. The velocity responsive cams then only operate above a set craft speed.

The case of piston 153 actuation is more complex, the consequences of operating a non-optimized system could also be far more reaching, i.e. case of instability of the servo loop. The stability of all servo-mechanisms of the type previously described depends largely on the gain provided by the system. Gain in this instance of force-amplifying mechanism is the equivalent of the ratio between the force applied on the sensor to the force developed by the actuating member of the system. In the present case, this ratio corresponds to the force reacting from the cam on the ball (sensor) divided by the force exerted by piston 153, which incidentally is mostly expended in actuating resisting part 152. Ball 142 indirectly receives a negligible portion of this actuating force.

In order to analyze the situation and evaluate the magnitude of such forces, then the displacement errors resulting therefrom, some assumptions need first be made. Referring to FIG. 10 graph, values of 2,000 psi and 200 psi are assumed for P' and P" respectively, allowing $P_i$ to vary between these two levels. An average operating level for $P_i$ can realistically be estimated at 1,200 psi. Thus as an approximation, a maximum pressure differential of 1,000 psi is available to actuate piston 153 in either direction. For the sake of simplicity, $(D^2-d^2)$ is made equal to $d^2$ so as to obtain symmetry. Thus $D=\sqrt{2}d$ and the effective area onto which the maximum pressure differential is applied is constant, regardless of the direction of the pressure differential application. The total force required of shaft 150 could be as high as a few thousand lbs. The effective area of piston 153 shaft could thus be 2 to 3 sq.in. Diameter d could be 1.5 to 2 inches. Diameter D could then be 2.5 to 3.5 inches. These numbers are quoted only to indicate the approximate size of those parts. Piston 153 stroke (dimension X of FIG. 14) could be about 3 in. The frequency response of the piston should be between 15 and 25 cps.

The set of numbers given above establishes a minimum size for restricting orifice 158. If the size is too small, hydraulic fluid can neither be supplied nor be evacuated fast enough to insure that the piston is enabled to move quickly enough. That minimum size then dictates the dimension of touch ball 142 which must allow the passage of a fluid flow rate as large as that which restricting orifice 158 permits. That maximum flow rate is about 100 in$^3$/sec and requires a pressure drop of roughly 1,000 psi to "push" it through orifice 158. Neglecting fluid density and viscosity, the flow rate of a liquid through such an orifice of area A is approximately: $\phi = A.(2\ g.\Delta P)^{\frac{1}{2}}$; where g is the gravitational constant, $\phi$ is the flow rate in in$^3$/sec, $\Delta P$ is the pressure drop through an orifice of area A in in$^2$. g must be expressed in in/sec$^2$ if $\Delta P$ is expressed in inches of water.

The result is an orifice diameter of about 3/16 inch. During steady-state operation of the actuator, the area of the variable size orifice formed by the touch ball is roughly equal to that of the fixed size restricting, or about 0.03 in$^2$. When the touch ball is pushed in completely, the opening inside lip 145 circle must have an area several times that of orifice 158, namely more than 0.10 in$^2$. The diameter of the lip circle then must be at least 0.35 inch. The gap area of the opening formed between the ball external surface and the cavity 143 wall internal surface, under steady-state or equilibrium conditions, is then about 0.030 in$^2$. The gap width thus is about 1/32 inch. A ball diameter between 0.4 and 0.5 inch appears adequate. When ball 142 closes the gap, the ball external surface rests on lip 145 edge. If full hydraulic pressure is applied on the ball (i.e. ~2,500 psi), the loads exerted on the lip is only 250 lbs. In order to unseat the ball, the cam surface must exert a force slightly higher. A point load of 250 lbs between a $\frac{1}{2}$-inch diameter ball and a hardened surface is only a fraction of the amount of loading which is acceptable in ball bearings. To insure that the ball rests on its seat when the helicopter is not operating, a cavity 253 houses a compression spring 255 which constantly urges ball 142 to close the variable size gap orifice.

The peak of the average controlling forces developed by piston 153 is of the order of 3,000 lbs. The average controlling force exerted on the ball is about 150 lbs. The servo-loop gain, as earlier defined, is thus approximately 20/1. The servo-mechanism illustrated in FIG. 9 is capable of much higher gains, which could easily be achieved by reducing the size of ball 142. As the reader will be aware, this entails a concomitant reduction in size of restricting orifice 158. For a given piston size and stroke, this would mean a reduction in piston peak velocity and a lowering of the frequency response value assumed previously. The touch ball might not be able then to follow the radial displacements of contact points 0 or 0' as housing 9 rotates around central shaft 57.

In the rough estimating process conducted above, the influence of the axial loads exerted by the blade on shaft 150 was neglected. Such loads, whatever the direction of their application, intervene only to the extent that they affect the levels of the hydraulic pressures applied on both sides of piston 153, a load $\Delta F$ causing a variation $\Delta P_i$ of the steady-state value $P_i$ which the intermediate hydraulic pressure would otherwise have reached. This translates into a concomitant variation of the size of the variable size orifice and a change in position of ball 142 with respect to lip 145 (distance $\delta X$ corresponding to and resulting from $\Delta F$). The ratio $\Delta F/\delta X$ is related to the system gain and directly affects the system stability. For those readers familiar with proportional ball governors, that ratio corresponds to the speed-drop of such governors. The reader is not doubt aware that the system must be designed so that the sum of the maximum variations of $\Delta F$ in both directions is less than the maximum forces that piston 153 is capable of developing, while $P_i$ values remain between P' and P" as shown in FIG. 10.

Because of the inclination of lip 145 at its circular contact with ball 142, an average gap width of 1/32 inch roughly means an axial displacement of the ball (or radial of contact point 0) of approximately 0.050-in. The total travel of ball 142 between both sides of this average value could be about 1/16 inch. Thus for a nominal ideal radial position of point 0 (cyclic pitch demanded), the position of part 152 or 152' could be anywhere within ±1/32 of an inch from the nominal ideal corresponding position which it should occupy. The magnitude and sign of this error depend on two factors: (1) the direction and the magnitude of the moment loads exerted by the blade, and (2) the rate of change in shaft position that the cam is imposing on the shaft at that time (velocity of piston 153). Further discussion of this subject is beyond the scope of this disclosure, suffices it to state two important conclusions at this juncture: (1) the positioning error inherent to this force-amplifying system is appreciably larger than those which tolerances on dimensions and aligments, and component deformations under loads, could cause in a well designed and constructed rotating housing, which means that they can provisionally be ignored; and (2) the corresponding relative error on cyclic pitch adjustment is only about ±1% of the total possible distribution range of the blade angle of attack variations, which should prove quite satisfactory.

It should be noted that during hovering and at steady low forward speeds, the demands placed upon the servo-mechanisms are either nil or represent only a small fraction of the values derived above. The total length of the possible travels of shafts 150 and 150' is used only at the maximum forward velocity of the helicopter, which is the condition considered for the assumptions made previously. It is believed that the dimensions arrived at above are realistic and possibly conservative. They can be used to determine other basic dimensions of the cams. The vertical travels of the cams should be of the order of 5 to 6 inches. The mean diameters of cams 140 and 141 could be at least 8 to 9 inches. The corresponding values for cam 101 could be the same travel, but a mean diameter of about 10 inches. It is emphasized here that the use of cams does not help miniaturize the blade drive system, it is only intended to provide means for adjusting the blade angle of attack in a more effective manner than the prior art does.

During forward flight, the touch balls and pistons 153 are in continuous motion. Instability or hunting of the follower systems is unlikely under such conditions. However, during hovering and more particularly low steady forward speed conditions, both the causes for initiating hunting and the reasons for sustaining it are present and most ideal. Adjusting either gain or friction, or both, is not desirable for such servo-mechanisms. Two approaches are worthy of consideration, the first earlier mentioned involves the use of a threshold in craft forward speed below which the velocity signal to the cam is caused not to be generated. The second solution, not exclusive of the first, is based on the use of simulated controlled fluid friction for damping small amplitude hunting oscillations. It is illustrated schematically in FIG. 9 drawings.

A piston 260 guided in cylinder 261 is positioned between two compression springs 262 and 263 opposing each other. Sliding piston 260 comprises restricting orifice 258 of a size much smaller than that of orifice 158 and a plurality of holes 264. Both piston 260 and cylinder 261 include cooperating lands 265 and 266 which slide alongside one another and present a very small clearance therebetween. The width $\lambda$ of the lands is short but such that in combination with the combined stiffnesses of springs 262 and 263, lands 265 and 266 in their cooperation open a long and narrow gap between two cooperating edges such as e' and e" when piston 260 is urged to slide toward the left. At such time, restricting orifice 258 is by-passed by holes 264 and the restriction presented to the fluid flow ceases. This can happen in either direction and only when the pressure drop through orifice 258 is large enough to generate the force which the changes in compression of springs 262 and 263 require to accommodate piston 258 displacement. Small piston incursions of amplitudes smaller than $\lambda$ cause a damping/dashpot effect on the servoflow, thus on any hunting oscillations that may otherwise be initiated.

The pressure drop caused by piston 260 in either direction is only a very small fraction of $P_i$, 1 to 2% at most, therefore negligible. However, if expressed as a fraction of $\Delta P_i$ as defined earlier, this pressure drop could represent a large fraction of $\Delta P_i$ under low craft forward speed conditions when $\Delta P_i$ is then naturally small. Another way to analyze such conditional damping approach is to consider the instantaneous gain values which then characterize the system. As long as lands 265 and 266 overlap, much larger axial displacements $\delta X$ of touch ball 142 are needed for a given response of piston 153. Typically, $\lambda$ could be ⅛ in. and piston 260 travel could be ⅜ in. so as to insure quick responses of piston 153 when cyclic pitch variations are large. Piston 260 then shuttles back and forth twice for every revolution of housing 9. The effect thereof on the frequency response of the follower is then negligible.

Rotating Housing Construction and Dimensioning

From the preceding discussion, it became clear that the design and construction of rotating housing 9 are critical. Reinforcing structural webs such as 270, 271, 272 and 273 of FIG. 4 should be lavishly distributed to insure maximum rigidity for minimum weight penalty. These are guarantees against those deformations which could affect the relative nominal positional relationships between cams and followers.

A cam system such as that presented herein facilitates the use of several blades per rotor. The number of blades is limited only by the angular space that each blade actuation mechanism requires inside housing 9. In FIG. 12, supporting structure 148 of the two follower mechanisms of each blade is shown separated by itself and attached to housing 9 upper dome-like structure. All supporting structures 148 can be joined together to form a cylindrical wall between the cams and the external cylindrical wall of housing 9 to which the balde hubs are connected. Again, stiffening webs may be interspaced circumferentially between the blade stations and these two walls. The only factor limiting the number of blades is then lever 201 angular motion amplitude. Levers 201—one per blade assembly—are necessarily located between the two concentric walls just mentioned. Lever 201 length is probably largest in the case of the dual cam construction.

Using nominal dimension values already mentioned, a reader familiar with the art will find that, approximately, the wall corresponding to supporting structures 148 must be located 8 in. from central shaft 57 axis and that about 16 in. are needed between this axis and the internal surface of housing 9 outer wall. Lever 201 may come as close as one inch to wall 148. The distance separating shaft 150 axis from control shaft 23 axis must be about 12 in., and a total angular movement of splines 31 of control shaft 23 is needed, i.e. 14°-15° total variation of the cyclic pitch adjustment. Such an angle for a lever length of 1 ft means a value of roughly 3 in. for dimension Y of FIG. 14. Taking into account structural members, parts and/or components required for part 152 and the reinforcing radial structural webs located between the two concentric cylindrical walls, the width of the space allocated to each blade mechanisms should be about 5 in. at its narrowest radial location, 9-inch distant from housing 9 rotation axis. This would indicate that, in such a design configuration, up to 11 blades could be mounted on one rotor. This number is much higher than that which usually charaterizes helicopters. The reader should remember that the 14°-15° angle variation allocated for cyclic pitch control is in addition to whatever angular adjustment that the collective pitch control requires.

The number of blades used on one rotor may of course be lower but, in the present case, a reduction of the number of blades is not synonymous with a reduction of the rotating housing radial dimension. That dimension is mostly predicated on or imposed by the requirements of a single blade cyclic pitch actuating mechanism, as demonstrated above. For smaller size helicopters, or for rotors having a large number of blades, the moment loads exerted on each blade are lower than those assumed earlier. A decrease in the values of such moments means a concomitant decrease of the loads which the follower actuating mechanisms must contend with. From the previous discussion, one may deduce the obvious, i.e. that there is an optimum rotor configuration, for any given helicopter size and peak performance, in which the number of blades is the key parameter. Further discussion of this subject is beyond the purpose of the present disclosure.

Finally, it should be pointed out that the construction of the present invention lends itself to the use of either fixed blades or hinged blades (or wings as they are sometimes called). In the case of a hinged blade helicopter, structure 12 of FIG. 1 which is solidly attached to hollow shaft 13, forming thereby a blade-root/hub for the blade, becomes a structural support member on which the blade (or wing) articulation is then mounted. Such construction is well known in the art and needs no additional elaboration. Hinged blades reduce the magnitudes of the pitching and rolling moments imposed on the helicopter through the rotor, however, they hardly affect the magnitudes of the moments exerted on the blades about their pitch axes. The use of hinged blades will only lower the requirements for stiffness and strength of rotating housing 9 and bearings 85, 87, 89 and 89'. Overall dimensions of housing 9, the cams and their followers will not be appreciably affected. Whether substantial weight gains might result is left to the reader to evaluate.

Oscillating Lever Guiding and Restraining System

A key component of the kinematic linkage which converts the radially-oriented axial motion of the powered actuating shafts 150 and 150' into limited rotational (or oscillatory) motion of pitch control shaft 23 is lever 201 and its guiding system. Lever 201, terminated by sliding bored and splined end 35, is only partially restrained at its other "free" end. As a matter of fact, the free end is constantly solicited by side loads directed obliquely with respect to splines 31' and/or shaft 150 axis, such side loads being essential to the motion reversible transformation. Roller 202 shape is such that, at any time during lever 201 oscillation, its barrel-shaped surface maintains constant contacts with both faces of slot cam 203 which forms a double-sided track, within the leeway caused by manufacturing clearances. Components perpendicular to lever 201 plane of oscillation of the side loads just mentioned generate moments on lever 201 which control shaft 23 should not be subjected to.

The drawings of FIGS. 12 and 15 indicate how guiding plates 168 and 169 by means of quasi-linear ball bearings 171 and 172 may be arranged and constructed to form a rigid box for providing a torque resisting member, said torque being transmitted to shaft 150' which is well supported by structure 148 and stem 152'. If a side force component F is exerted on roller 202 perpendicularly to the plane containing FIG. 12, the force exerted on either the set of inner or outer bearings 171 or 172 is $F_b = F.L/l$, L being somewhat design-imposed, one sees why l should be as large as possible. The situation in the case of FIG. 7 construction is different. Theoretically, lever 201 could be shorter and shaft 150' is absent—only one cam-follower mechanism is required. It appears that the moment exerted by lever 201 on splines 31' may still prove unacceptedly prejudicial to the proper functioning of pitch control shaft 23.

For that reason, a guiding-plate box-type construction similar to that shown in FIGS. 12, 15, 16 and 17 can be used in an identical manner. However, in this instance, one plate (e.g. 168) can be a flat section of rotating housing 9, thus well supported, whilst the remaining portion of the box structure of FIGS. 12 and 15 protrudes inwardly from the rotating housing wall and contains that portion of lever 201 which is guided within the box confines as shown by dotted lines dl of FIG. 15. The width W of lever 201 may be widened in that portion so as to spread the side loads between a larger number of balls.

Concluding Remarks

Two specific preferred embodiments of the general preferred embodiment of the present invention are described and discussed hereinabove, namely those corresponding to FIGS. 7 and 8. A choice between these two specific embodiments in term of being better cannot be made without extensive design and analytical work and possibly test results. The basic difference between these two design options consists in the replacement of one cam and follower/actuation system by an obliquely splined axially-movable shaft. The differences in system performance, although pointed out previously, cannot be estimated with enough accuracy and/or validity to be used as a selection criterion. However, it is believed that the single compounded cam construction, for the same number of blades per rotor, has the potential of allowing larger total amplitudes of cyclic pitch variations. This is due to the shorter length of levers 201. Conversely, the maximum practical value of this parameter remaining the same, either the maximum of the number of blades could be slighly increased or the outer diameter of rotating housing 9 could be slightly decreased.

An attempt was made in this disclosure to give enough information and alternatives to enable the helicopter designer to study and decide on what course of investigation to follow. Optimization analytical investigations should provide the designer with the data needed for selecting the design path to follow. The purpose given to the present disclosure, in addition to that of disclosing pertinent subject matter, is to widen the range of avenues open to helicopter designers for advancing the art of flight control thereof.

It is thought that the helicopter blade cyclic pitch control system apparatus and method of the present invention and many of its attendant advantages will be understood from the foregoing description and it will be apparent that various changes may be made in the form, construction and arrangement of the parts thereof without departing from the spirit and scope of the invention or sacrificing any or all of its material advantages, the form hereinbefore described being merely a preferred or exemplary embodiment thereof.

Now, having thus disclosed my invention, I claim:

1. A helicopter blade cyclic pitch control system, said system comprising:
   a fixed housing for mounting on an airframe;
   a rotatable housing mounted on said fixed housing for rotating about a substantially vertical axis;
   a plurality of blades, each having a pitch axis substantially orthogonal to said substantially vertical axis, rotatably mounted at an inner end to said rotatable housing and extending radially outward therefrom for rotation about said pitch axis;
   a central support shaft mounted within said housings and extending along said substantially vertical axis;
   cyclic pitch control means comprising an axially moveable radial cam system non-rotatably mounted on said central support shaft from imposing a selective cyclic pitch on said blades as said rotatable housing rotates about said vertical axis; and
   collective pitch control means comprising an axially movable cam mounted on said support shaft for axial movement thereon, pilot input control means for selectively moving said axially movable cam along said central support shaft, and a push-pull follower positively engaging said cam and operatively connected to said blades for independently imposing a collective pitch on said blades independently of said cyclic pitch control means;
   whereby the axially moveable radial cam system non-rotatably mounted on the central support shaft includes a two-dimensional cam also non-rotatably mounted on the central support shaft and capable of axial movement thereabout, said axial movement being independently imposed by axially actuating means controlled by the helicopter forward velocity and independent of pilot control, thereby enabling the cyclic pitch control means to superimpose a non-sinusoidal programmed pitch variation on the collective pitch of the blades, said non-sinusoidal pitch variation being determined independently by the position of the blade in its rotation about the vertical axis and by the helicopter forward speed, albeit remaining independent of the collective pitch adjustment onto which said non-sinusoidal variation is superimposed.

2. A helicopter blade cyclic pitch control system according to claim 1 wherein the axially actuating means controlled by the helicopter forward speed further includes:
   piston means slideably mounted on the central shaft and rotatable thereabout for axially positioning said two-dimensional cam in response to a hydraulic pressure controlled by the helicopter indicated forward speed relatively to the surrounding air.

3. A helicopter blade cyclic pitch control system according to claim 2 wherein the central support shaft is mounted inside the rotatable housing for limited axial and angular movements about its axis in response to the pilot control input means, and further comprising:
   means for imposing the axial displacement of said central shaft on means under pilot control for adjusting the amplitude of a quasi-sinusoidal cyclic pitch variation so as to set and adjust the helicopter forward speed;
   means for containing and supporting a hydraulically operated mechanism which provides the helicopter-speed-responsive hydraulic pressure for actuating the piston means; and
   means for enabling said containing and supporting means to remain unaffected by central shaft axial and angular movements;
   whereby the axial movement of the central shaft controls the helicopter forward velocity and the angular movement of the central shaft determines the direction of said forward velocity relatively to a reference longitudinal axis of the airframe.

4. A helicopter blade cyclic pitch control system according to claim 3 wherein the axially moveable cam and the associated push-pull follower for controlling collective pitch further includes:
   a ball for sliding along an open circular cooperating groove having its axis oriented about a generatix of a conical surface of revolution around the central shaft axis, said groove being located in said axially-moveable cam structure;
   a stem for connecting said ball to a pitch control shaft slidable radially about a substantially horizontal axis located in the plane defined by the groove and the central shaft axes; and
   means for guiding and restraining tnhe pitch control shaft in its radial sliding movement;
   whereby the ball and the pitch control shaft are enabled to rotate freely about the control shaft axis, the radial displacement of the pitch control shaft is singularly and uniquely determined by the vertical displacement of said cam, and said pitch control shaft is enabled to rotated about its axis without affecting and influencing its own radial movement.

5. A helicopter blade cyclic pitch control system according to claim 4 wherein the pitch control shaft further includes:
   means mounted on a hub located at the blade inner end for centering the control shaft with respect to said blade hub and for cooperating with corresponding cylindrical sections of the control shaft to form supporting journals;
   a helically splined section for engaging a cooperating helically splined section of the blade hub located therein for enabling an axial displacement of the control shaft to cause a corresponding limited rotation of the blade hub; and
   a section having straight splines for engaging a cooperating splined bore at the end of a lever capable of limited oscillations about the control shaft axis so that said oscillations may be imposed on the control shaft without affecting and influencing the control shaft radial position and so that an axial displacement of the control shaft neither affects nor influences the control shaft angular position;
   whereby the blade hub is rotatably mounted in a cooperating structure of the rotating housing so as to be axially and laterally restrained thereby, the lever oscillatory movement superimposes the cyclic pitch variation on the blade collective pitch adjustment, and said cyclic pitch variation and said collective pitch adjustment are caused to remain independent of each other.

6. A helicopter blade cyclic pitch control system according to claim 5 wherein the cyclic pitch control means further includes:
   a touch ball continuously maintained in contact with a surface of the axially moveable radial cam system for transmitting the radial movement of the contact point therebetween;
   a shaft assembly responsive to the ball radial position for radial movement relative to the rotating housing and guided thereby for rotation therewith;
   means for powering the shaft assembly so as to enable said shaft to exert forces on the lever of a magnitude much larger than the force exerted by the ball on its cooperating and actuating cam surface; and
   means for enabling said shaft in its radial displacement to impose a singular position of the lever along the motion mode allowed therefor.

7. A helicopter blade cyclic pitch control system according to claim 6 wherein the means for powering the shaft assembly further includes:
   a piston mounted on said shaft located in a cylinder structure attached to the rotating housing for radial movement;
   a cylindrical shaft section for forming a piston stem of diameter smaller than that of the piston for sliding through one of the two cylinder end closures, the other being closed;
   sealing means around the piston and the stem for preventing leakage of the hydraulic fluid;
   a first duct through the piston for connecting the two chambers formed between the piston and each one of the cylinder end closures, said duct containing a fixed size restricting orifice;
   a source of hydraulic fluid at high pressure for supplying said hydraulic fluid to the first chamber located on the stem side of the piston; and
   a second duct located inside the shaft for connecting the second chamber to a spherical cavity containing the touch ball, said cavity being terminated by a circular opening having a diameter smaller than that of the ball, and the diameter of said cavity being slightly larger than that of the ball;
   whereby the ball and the circular edge of the opening cooperate to form a variable size restricting orifice through which the hydraulic fluid may escape into the rotating housing, thus creating a pressure drop through the fixed size orifice and causing the pressure in the second chamber to become lower than the pressure existing in the first chamber;

whereby the area of the variable size orifice is caused to vary between zero and an area several times larger than the area of the fixed size orifice, according to the position occupied by the ball relatively to the circular opening, thereby causing the pressure forces acting on the piston to urge the shaft assembly to follow the ball motion so as to maintain said pressure-generated forces exerted on each piston side balanced; and whereby the piston diameter is much larger than the circular opening diameter, thus enabling the piston to develop forces of magnitude much greater than that of the forces exerted on said touch ball and required to cause its motion.

8. A helicopter blade cyclic pitch control system according to claim 7 wherein the hydraulic fluid flow through the second duct inside the shaft assembly is caused to pass through an on/off hydraulic switch operated by a pressure differential, said on/off hydraulic switch further comprising:

a shuttle piston positioned by and between two springs mounted in opposition, said piston containing a small restricting orifice;

means for enabling the flow to by-pass the small restricting orifice when the pressure differential across the shuttle piston exceedcs a set level; and means for limiting the pressure drop through the by-pass to a value only slightly larger than said pressure differential;

whereby a damping action is introduced in the fluid servoloop so as to minimize the possibility of initiating and sustaining unstable operating conditions of the shaft assembly.

9. A helicopter blade cyclic pitch control system according to claim 8 wherein the piston means for positioning said two-dimension in response to hydraulic pressure includes a compression spring mounted between two holding and centering flanges:

a first flange attached to a cylinder-piston and moveable vertically therewith, whereby an increase of the hydraulic pressure applied to said piston causes a further compression of said spring; and a second flange having a fixed vertical position for resisting the compression force exerted by the spring and which corresponds to the hydraulic pressure forces exerted on the piston.

10. A helicopter blade cyclic pitch control system according to claim 9 wherein the axially-moveable cam structure actuating the push-pull follower for collective pitch control is mounted on a central structure located between the central support shaft and the rotating housing, and further comprises:

slideable supporting means for connection with said central shaft;

means for centering said central structure with respect to the rotating housing; and means for adjusting said central structure, hence said cam structure, vertical position in response to pilot control input.

11. A helicopter blade cyclic pitch control system according to claim 10 wherein the central structure rotates with the rotating housing, and further comprises:

a linear ball bearing assembly located between said central structure and the rotating housing for enabling relative axial movement therebetween, whilst preventing relative rotational movement therebetween; and rotatable means for connecting the enabling means of the containing and supporting mechanism providing hydraulic pressure to the piston means to the fixed housing.

12. A helicopter blade cyclic pitch control system according to claim 10 wherein the central structure is rotatable and slidable relatively to the rotating housing, and further comprises:

rotatable bearing means for connecting the cam structure to said central structure; and rotatable bearing means for connecting the enabling means of the containing and supporting mechanism providing hydraulic pressure to the piston means to the rotable housing.

13. A helicopter blade cyclic pitch control system according to claim 10 wherein the cam surface contacted by the touch ball is generally undevelopable and is defined at the point of contact with said ball by two types of curvature, a first curvature in a first-type plane perpendicular to the rotating housing axis of rotation, a second curvature in a second-type plane passing by said axis of rotation, thereby defining two families of curves for determining said cam surface, said two families of curves comprising:

contour curves formed by the contact point locii contained in the first-type planes; and profile curves formed by the contact point locii contained in the second-type planes;

whereby contour curves represent in polar coordinates the variations of cyclic pitch amplitude distribution as a function of the gyrating blade angular position relatively to the airframe, and profile curves represent in rectangular coordinates the variations of cyclic pitch amplitude adjustments as a function of the input of a parameter generated externally to the rotating housing, thus causing touch ball radial displacements to represent a programmed combination of blade angular positions and external parameter input values, independently of each other.

14. A helicopter blade cyclic pitch control system according to claim 13 wherein the axially-movable radial cam system has only one single cam surface, said surface being enabled to move radially relatively to the central support shaft axis, and further includes:

an obliquely oriented straight-splined shaft mounted on the central support shaft, rotationally and axially moving therewith, the centerline of said shaft intersecting the central support shaft axis;

an obliquely splined substantially horizontal structure for sliding motion of the obliquely oriented shaft and for rotation about the axis of the central support shaft and therewith, said splined structure being part of the two-dimensional cam structural body; and means for connecting said cam body to the piston means controlled by the helicopter forward speed in a manner allowing planar slidable motion of the cam body and so as to positively impose the piston means vertical displacements on said cam;

whereby the distance between the ball/cam-surface contact point and the central support shaft axis represents the combined result of pilot control input for forward velocity demand, blade gyrating angular position and actual indicated airspeed inputs.

15. A helicopter blade cyclic pitch control system according to claim 14 wherein the radial movement of said contact point is imposed on a slot double-faced cam so as to convert said radial movement of the follower along its axis into an oscillatory motion of a lever rotatable about the axis of the pitch control shaft and slideable at one restrained end on the straight-splined section of said control shaft, and further comprising:
- a shaped roller restrained between the two parallel active faces of the slot cam oriented obliquely relatively to the axis of the cam-follower shaft, said roller shape being such that oscillations of the roller axis do not affect the roller/slot-face contacts, said roller being mounted on the free end of said lever;
- a straight-splined structure attached to the rotating housing for guiding the follower shaft onto which the slot cam is mounted and for preventing same from rotating about said shaft axis; and
- means attached to the rotating housing for guiding the lever in the plane containing its oscillatory motion.

16. A helicopter blade cyclic pitch control system according to claim 13 wherein the axially-moveable radial cam system includes two separate cams, each one having its own two-dimensional surface, both said surfaces being enabled to move axially relatively to the axis of the central support shaft and rotatable therewith, said cam system further comprising:
- a first cam fixedly mounted on the central support shaft for response to the pilot cyclic pitch control input;
- a second cam slideable on the central support shaft for vertical movement thereon in response to piston means displacements, hence to helicopter actual indicated airspeed;
- a first follower mechanism for transmitting the radial displacements of the touch-ball contact point with the first cam;
- a second follower mechanism for transmitting the radial displacements of the touch-ball contact point with the second cam;
- and means for combining both radial displacements into an oscillatory motionn of a single lever directly and slideably spline-connected to the pitch control shaft;
- whereby the pitch control shaft receives one single rotational input representative of the blade instantaneous cyclic pitch value required, said single input including pilot control demand input, craft actual airspeed and blade gyrating angular position inputs.

17. A helicopter blade cyclic pitch control system according to claim 16 wherein the means for combining both radial displacements into one single oscillatory motion further comprises:
- a slot-cam having two parallel active faces and mounted on the shaft of the first follower mechanism for containing and guiding a shaped roller mounted at the free end of said lever, said faces being oriented obliquely with respect to the axis of the shaft of the follower mechanism, and the shape of said roller being such that oscillations of the roller axis do not affect the roller/slot-face contact mode;
- a planar guiding and restraining mechanism having two plates positioned perpendicularly to the axis of the shaft of the second follower mechanism and mounted on the shaft thereof, said lever being located between the two plates for oscillating sliding movement in the mid-plane thereof;
- spline means located on the restrained end of the lever for engaging the straight-splined section of the pitch control shaft;
- and a structure attached to the rotating housing and having two straight-splined bores for engaging and guiding cooperating splined sections, one on each follower mechanism shaft, of the follower shaft assemblies;
- whereby the axial displacements of the two follower mechanisms are caused to combine into one single oscillatory displacement of the lever, hence of the pitch control shaft, thus representating the end result of the combination of independent inputs given by the pilot control for forward speed demand, blade gyrating angular position and actual indicated craft airspeed.

18. A helicopter blade cyclic pitch control system according to claim 13 wherein the construction of the rotating housing, the blade actuating mechanisms, the blade pitch controls and the blade rotating attachments to the rotating housing around a centrally located cam control system enables the equidistant angular positioning of any number of blades up to at least ten per rotor disc.

19. A method of controlling the distributions of the pitch angles of an helicopter blades in response to: (1) pilot control input, (2) blade angular positions in the disc formed by the gyrating blades, and (3) and velocity of the airstream relative to said helicopter in its forward motion, by means of a pitch control shaft rotatably actuating each blade independently, a central support shaft under pilot control, a rotating housing supporting said blades and mounted on a fixed housing attached to the helicopter frame, a central structure under pilot control, a single cam mounted on said structure for positive axial actuation of said pitch control shafts for collective pitch adjustment, a radial-cam system responsive to pilot control input and helicopter actual airspeed and rotating housing angular position for cyclic pitch control, a movement-mode converting mechanism for each blade spline-connected to the pitch control shaft, piston means axially slideable on the central support shaft and actuated by hydraulic pressure in response to helicopter indicated forward speed, a cam-follower system for transmitting the radial displacements of a cam-surface contact with a position sensing touch-ball, said cam surface having a double curvature at each of the contact points, a force-amplifying system for resisting moment loads transmitted by each blade about a pitch axis and mechanically isolating the radial-cam system for said loads, guiding structures mounted on the rotating housing for supporting cam-follower shafts, said blades being rotatably attached to the rotating housing and restrained axially outwardly by hollow hubs and bearing means for limited rotation about the blade pitch axes, said method comprising the steps of:
- pilot-adjusting the vertical axis position of the central structure and cam thereon, thereby simultaneously setting the collective pitch of all blades by means of cooperating helical splines located on both the pitch control shafts and the blade hubs;
- pilot-adjusting the orientation of the central support shaft relatively to the helicopter frame, thereby setting the direction in which the helicopter starts flying forward upon adjustment of the cyclic pitch control system;

pilot-adjusting the vertical position of the central support shaft and radial-cam system thereon, thereby imposing a radial displacement of a two-dimensional surface thereof with respect to the helicopter frame, thus setting the amplitudes of the cyclic pitch variations representative of the forward velocity demanded by the pilot of the helicopter;

causing a gradual radial adjustment of the radial-cam system surface in response to the airstream velocity relative to the helicopter as it accelerates forward; and generating variations continuously and automatically in the angular distribution of blade pitch angles as said blade gyrates and in response to actual airspeed so as to minimize blade tip stall and vibrations for optimizing helicopter performances.

20. The method as claimed in claim 19 in which the radial-cam system includes a single radial cam having a two-dimensional surface radially moveable relative to the central support shaft by means of an obliquely oriented splined shaft affixed thereto and engaging cooperating splines in the structural body of said cam, said cam having means for slideably radially connecting self to the helicopter velocity-responsive piston means so as to make the cam two-dimensional surface position responsive to central support shaft axial and angular positions, helicopter indicated forward speed and blade angular position in its gyration, said method comprising the further steps of:

adjusting the radial position of said cam surface by pilot-setting of the vertical position of said central shaft;

adjusting the orientation of said cam surface relatively to the helicopter frame by pilot-setting of the angular position of said central shaft; and converting the radial motion of a single-cam follower shaft, slidingly guided and rotatably restrained by a structure attached to the rotating housing, caused by the contact point with said surface into an oscillatory motion of a lever in a single plane parallel to the central support shaft axis and determined by a guiding structure attached to the rotating housing, said lever being capable of limited rotation about the pitch control shaft and having a free end equipped with a roller guided in a slot cam mounted on the cam-follower shaft, said slot cam having two active parallel faces obliquely oriented in respect with the cam follower shaft axis, so as to transform the radial linear variations of cyclic pitch combined input into limited angular rotational variations of the blade pitch angle about the blade pitch axis.

21. The method as claimed in claim 19 in which the radial-cam system includes two radial cams, a first cam having a developable cam surface and affixed to the central support shaft for axial and rotational movements therewith, and for actuation of a first cam-follower shaft, a second cam having a two-dimensional cam surface and axially slideable on said central shaft, and being actuated by the velocity-responsive piston means, and for actuation of a second cam-follower shaft, said first and second shafts being prevented from rotating about their own axes and radially supported and guided by a structure attached to the rotating housing, said first shaft being equipped with a slot cam having two active parallel faces obliquely oriented with respect to the shaft axis for guiding a roller mounted on the free end of a lever having its other end bored and splined for engaging a cooperating splined section of the pitch control shaft for oscillatory motion about the pitch control shaft axis in a plane perpendicular thereto, said second shaft being equipped with two parallel plates orthogonally mounted on the shaft so as to contain and to guide the lever, thus enabling the plane in which said lever oscillates to occupy various parallel positions at distances from the central support shaft determined by the second cam-follower radial position, said method comprising the further steps of:

adjusting the radial position of the slot cam in response to the axial movement of the central support shaft;

causing a resulting ocillatory displacement of the lever for a set position of the guiding plates, hence for a given forward velocity of the helicopter;

creating a concomitant limited rotational displacement of the pitch control shaft, hence of the blade;

adjusting the position of the two-dimensional cam-surface as the helicopter forward velocity varies, hence of the second shaft and plates mounted thereon;

urging the lever to oscillate so as to accommodate the cooperation of the roller and of the slot cam obliquely oriented track, for a given set position of the first shaft, thereby further adjusting the blade instantaneous pitch angle according to the airstream velocity relative to the helicopter at that momement.

22. A servo-powered force-amplifying cam-following mechanism for positioning the blade of a helicopter wherein a cam supporting structure and the cam surface are mechanically isolated from the aerodynamic-moment-generated loads applied to and transmitted by the blade to its driving structure, and the loads exerted on the cam surface are limited to a set maximum value, said mechanism comprising:

a touch-ball for contacting the cam surface, rolling thereon and thereby determining a contact point position;

a socket with a inner spherical cavity of a size slightly larger than the ball for holding the ball and connected to a shaft, said cavity having a circular opening of diameter smaller than the ball diameter and through which a portion of the ball is allowed to protrude;

a guiding structure for enabling the shaft to maintain a set axial position with respect to a cam axis of rotation relatively to said guiding structure;

a structural part mounted on said shaft and to which motion and loads are to be imparted as a result of the cam surface displacement;

a stem connecting said part to an actuating piston;

a supply of hydraulic fluid under pressure for powering said piston;

means cooperating with the piston for forming two chambers, one on each side of the piston, through which the hydraulic fluid is enabled to flow;

duct means for enabling the fluid to flow from one chamber to the other and from one chamber to the ball-housing cavity;

a fixed size restricting orifice positioned between the two chambers for creating a variable pressure difference between the pressures existing inside the two chambers when the fluid flows;

whereby the movement of the ball into and away from the cavity circular opening causes the discharge area of the variable size orifice thus formed to change, thereby causing the pressure differential across the piston to adjust accordingly for reestablishing the balance of the loads exerted on the piston, in a manner such that a displacement of the piston, shaft, structural part and socket must occur to adjust the area of the gap created between the touch-ball surface and the circular-opening lip, thus causing the servo-powered mechanism to constantly, automatically and continuously follow the externally imposed displacements of the touch-ball contact point.

23. A servo-powered mechanism according to claim 22 wherein the duct channelling the fluid to the socket cavity contains a damping means for restricting the fluid flow only when the pressure differential across said means is lower than a set value much smaller than the fluid operating pressure level, whereby low amplitude oscillating hunting displacements of the shaft are prevented from being initiated and sustained.

* * * * *